(12) United States Patent
Hansson et al.

(10) Patent No.: US 11,480,659 B2
(45) Date of Patent: Oct. 25, 2022

(54) DETECTION SYSTEM WITH REFLECTIVE MEMBER ILLUMINATED FROM MULTIPLE SIDES

(71) Applicant: Veoneer US, LLC, Wilmington, DE (US)

(72) Inventors: Peter Hansson, Southfield, MI (US); Emil Hallstig, Southfield, MI (US); Bernard DeMersseman, Southfield, MI (US); Mauritz Andersson, Southfield, MI (US)

(73) Assignee: Veoneer US, LLC, Wilmington, DE (US)

( * ) Notice: Subject to any disclaimer, the term of this patent is extended or adjusted under 35 U.S.C. 154(b) by 918 days.

(21) Appl. No.: 16/105,133

(22) Filed: Aug. 20, 2018

(65) Prior Publication Data

US 2019/0101627 A1 Apr. 4, 2019

Related U.S. Application Data

(60) Provisional application No. 62/594,284, filed on Dec. 4, 2017, provisional application No. 62/565,373, filed on Sep. 29, 2017.

(51) Int. Cl.
*G01S 7/481* (2006.01)
*G01S 17/87* (2020.01)
(Continued)

(52) U.S. Cl.
CPC .............. *G01S 7/4817* (2013.01); *B60Q 1/52* (2013.01); *G01S 7/4811* (2013.01);
(Continued)

(58) Field of Classification Search
None
See application file for complete search history.

(56) References Cited

U.S. PATENT DOCUMENTS 3,712,985 A 1/1973 Swarner et al.
3,898,656 A 8/1975 Jensen
(Continued)

FOREIGN PATENT DOCUMENTS

AT 509180 B1 1/2016
DE 19757840 C1 9/1999
(Continued)

OTHER PUBLICATIONS

International Search Report and Written Opinion for International Application No. PCT/US2020/064474, dated Apr. 1, 2021.
(Continued)

*Primary Examiner* — Yuqing Xiao
*Assistant Examiner* — Benjamin Richard Hebert
(74) *Attorney, Agent, or Firm* — Burns & Levinson LLP; Steven M. Mills

(57) ABSTRACT

A detection system for a vehicle in an environment includes at least one reflective member having a rotational axis and a plurality of reflective sides. Each of the reflective sides slopes towards the rotational axis at a slope angle different than the slope angle of at least one of the others of the reflective sides. The system includes a plurality of LiDAR systems with at least one light transmitter and at least one light receiver, each LiDAR system interacting with a different one of the reflective sides to scan the environment.

12 Claims, 15 Drawing Sheets

(51) Int. Cl.
  *G02B 5/09* (2006.01)
  *G02B 26/12* (2006.01)
  *G01S 17/42* (2006.01)
  *G01S 17/04* (2020.01)
  *G01S 17/931* (2020.01)
  *G01S 17/06* (2006.01)
  *B60Q 1/52* (2006.01)
  *G01S 13/931* (2020.01)

(52) U.S. Cl.
  CPC .......... *G01S 7/4812* (2013.01); *G01S 7/4813* (2013.01); *G01S 7/4815* (2013.01); *G01S 17/04* (2020.01); *G01S 17/06* (2013.01); *G01S 17/42* (2013.01); *G01S 17/87* (2013.01); *G01S 17/931* (2020.01); *G02B 5/09* (2013.01); *G02B 26/12* (2013.01); *G01S 2013/93271* (2020.01); *G01S 2013/93276* (2020.01)

(56) References Cited

U.S. PATENT DOCUMENTS

| | | | |
|---|---|---|---|
| 4,125,864 A | 11/1978 | Aughton | |
| 4,184,154 A | 1/1980 | Albanese et al. | |
| 4,362,361 A | 12/1982 | Campbell et al. | |
| 4,439,766 A | 3/1984 | Kobayashi et al. | |
| 4,765,715 A | 8/1988 | Matsudaira et al. | |
| 4,957,362 A | 9/1990 | Peterson | |
| 5,200,606 A | 4/1993 | Krasutsky et al. | |
| 5,210,586 A | 5/1993 | Grage et al. | |
| 5,274,379 A | 12/1993 | Carbonneau | |
| 5,428,215 A | 6/1995 | Dubois et al. | |
| 5,604,695 A | 2/1997 | Cantin et al. | |
| 5,793,491 A | 8/1998 | Wangler et al. | |
| 5,889,490 A | 3/1999 | Wachter et al. | |
| 5,966,226 A | 10/1999 | Gerber | |
| 6,078,395 A | 6/2000 | Jourdain et al. | |
| 6,122,222 A | 9/2000 | Hossack | |
| 6,292,285 B1 * | 9/2001 | Wang ............... G02B 5/09 347/243 | |
| 6,384,770 B1 | 5/2002 | de Gouy | |
| 6,437,854 B2 | 8/2002 | Hahlweg | |
| 6,556,282 B2 | 4/2003 | Jamieson et al. | |
| 6,559,932 B1 | 5/2003 | Halmos | |
| 7,202,941 B2 | 4/2007 | Munro | |
| 7,227,116 B2 | 6/2007 | Gleckler | |
| 7,272,271 B2 | 9/2007 | Kaplan et al. | |
| 7,440,084 B2 | 10/2008 | Kane | |
| 7,483,600 B2 | 1/2009 | Achiam et al. | |
| 7,489,865 B2 | 2/2009 | Varshneya et al. | |
| 7,544,945 B2 | 6/2009 | Tan et al. | |
| 7,570,347 B2 | 8/2009 | Ruff et al. | |
| 7,675,610 B2 | 3/2010 | Redman et al. | |
| 7,832,762 B2 | 11/2010 | Breed | |
| 8,044,999 B2 | 10/2011 | Mullen et al. | |
| 8,050,863 B2 | 11/2011 | Trepagnier et al. | |
| 8,134,637 B2 | 3/2012 | Rossbach et al. | |
| 8,223,215 B2 | 7/2012 | Oggier et al. | |
| 8,363,511 B2 | 1/2013 | Frank et al. | |
| 8,508,723 B2 | 8/2013 | Chang et al. | |
| 8,629,975 B1 | 1/2014 | Dierking et al. | |
| 8,742,325 B1 | 6/2014 | Droz et al. | |
| 8,836,761 B2 | 9/2014 | Wang et al. | |
| 8,836,922 B1 | 9/2014 | Pennecot | |
| 8,879,050 B2 | 11/2014 | Ko | |
| 9,007,569 B2 | 4/2015 | Amzajerdian et al. | |
| 9,063,549 B1 | 6/2015 | Pennecot et al. | |
| 9,086,273 B1 | 7/2015 | Gruver et al. | |
| 9,090,213 B2 | 7/2015 | Lawlor et al. | |
| 9,097,646 B1 | 8/2015 | Campbell et al. | |
| 9,140,792 B2 | 9/2015 | Zeng | |
| 9,157,790 B2 | 10/2015 | Shpunt et al. | |
| 9,267,787 B2 | 2/2016 | Shpunt et al. | |
| 9,285,477 B1 | 3/2016 | Smith et al. | |
| 9,575,162 B2 | 2/2017 | Owechko | |
| 9,618,742 B1 | 4/2017 | Droz et al. | |
| 9,651,417 B2 | 5/2017 | Shpunt et al. | |
| 9,658,322 B2 | 5/2017 | Lewis | |
| 9,696,427 B2 | 7/2017 | Wilson et al. | |
| 9,711,493 B2 | 7/2017 | Lin | |
| 9,753,351 B2 | 9/2017 | Eldada | |
| 9,823,351 B2 | 11/2017 | Haslim et al. | |
| 9,857,472 B2 | 1/2018 | Mheen et al. | |
| 9,869,754 B1 | 1/2018 | Campbell et al. | |
| 10,018,725 B2 | 7/2018 | Liu | |
| 10,018,726 B2 | 7/2018 | Hall et al. | |
| 10,024,655 B2 | 7/2018 | Raguin et al. | |
| 10,078,133 B2 | 9/2018 | Dussan | |
| 10,088,557 B2 | 10/2018 | Yeun | |
| 10,148,060 B2 | 12/2018 | Hong et al. | |
| 10,175,360 B2 | 1/2019 | Zweigle et al. | |
| 10,183,541 B2 | 1/2019 | Van Den Bossche et al. | |
| 10,408,924 B2 | 9/2019 | Mheen | |
| 10,411,524 B2 | 9/2019 | Widmer et al. | |
| 10,416,292 B2 | 9/2019 | de Mersseman et al. | |
| 10,473,767 B2 | 11/2019 | Xiang et al. | |
| 10,473,784 B2 | 11/2019 | Puglia | |
| 10,473,943 B1 | 11/2019 | Hughes | |
| 10,557,923 B2 | 2/2020 | Watnik et al. | |
| 10,558,044 B2 | 2/2020 | Pan | |
| 10,564,268 B2 | 2/2020 | Turbide et al. | |
| 10,578,724 B2 | 3/2020 | Droz et al. | |
| 10,678,117 B2 | 6/2020 | Shin et al. | |
| 10,775,508 B1 | 9/2020 | Rezk et al. | |
| 2001/0052872 A1 | 12/2001 | Hahlweg | |
| 2003/0043363 A1 | 3/2003 | Jamieson | |
| 2004/0028418 A1 | 2/2004 | Kaplan et al. | |
| 2004/0031906 A1 | 2/2004 | Glecker | |
| 2004/0135992 A1 | 7/2004 | Munro | |
| 2004/0155249 A1 | 8/2004 | Narui et al. | |
| 2005/0219506 A1 | 10/2005 | Okuda et al. | |
| 2006/0221250 A1 | 10/2006 | Rossbach et al. | |
| 2006/0232052 A1 | 10/2006 | Breed | |
| 2006/0239312 A1 | 10/2006 | Kewitsch et al. | |
| 2007/0140613 A1 | 6/2007 | Achiam et al. | |
| 2007/0181810 A1 | 8/2007 | Tan et al. | |
| 2007/0211786 A1 | 9/2007 | Shatill | |
| 2007/0219720 A1 | 9/2007 | Trepagnier et al. | |
| 2008/0088499 A1 | 4/2008 | Bonthron et al. | |
| 2008/0095121 A1 | 4/2008 | Shatill | |
| 2008/0100510 A1 | 5/2008 | Bonthron | |
| 2008/0219584 A1 | 9/2008 | Mullen et al. | |
| 2008/0246944 A1 | 10/2008 | Redman et al. | |
| 2009/0002680 A1 | 1/2009 | Ruff et al. | |
| 2009/0010644 A1 | 1/2009 | Varshneya | |
| 2009/0190007 A1 | 7/2009 | Oggier | |
| 2009/0251361 A1 | 10/2009 | Bensley | |
| 2010/0027602 A1 | 2/2010 | Abshire et al. | |
| 2010/0128109 A1 | 5/2010 | Banks | |
| 2010/0157280 A1 | 6/2010 | Kusevic et al. | |
| 2010/0182874 A1 | 7/2010 | Frank et al. | |
| 2012/0075422 A1 | 3/2012 | Wang et al. | |
| 2012/0182540 A1 | 7/2012 | Suzuki | |
| 2012/0206712 A1 | 8/2012 | Chang et al. | |
| 2012/0236379 A1 | 9/2012 | da Silva et al. | |
| 2012/0310516 A1 | 12/2012 | Zeng | |
| 2012/0310519 A1 | 12/2012 | Lawlor et al. | |
| 2013/0088726 A1 | 4/2013 | Goyal et al. | |
| 2013/0093584 A1 | 4/2013 | Schumacher | |
| 2013/0120760 A1 | 5/2013 | Raguin et al. | |
| 2013/0166113 A1 | 6/2013 | Dakin et al. | |
| 2013/0206967 A1 | 8/2013 | Shpunt et al. | |
| 2013/0207970 A1 | 8/2013 | Shpunt et al. | |
| 2013/0222786 A1 | 8/2013 | Hanson et al. | |
| 2013/0250276 A1 | 9/2013 | Chang et al. | |
| 2014/0036252 A1 | 2/2014 | Amzajerdian et al. | |
| 2014/0049609 A1 | 2/2014 | Wilson | |
| 2014/0152975 A1 | 6/2014 | Ko | |
| 2014/0168631 A1 | 6/2014 | Haslim | |
| 2014/0233942 A1 | 8/2014 | Kanter | |
| 2014/0313519 A1 | 10/2014 | Shpunt et al. | |
| 2015/0009485 A1 | 1/2015 | Mheen | |
| 2015/0055117 A1 | 2/2015 | Pennecot et al. | |
| 2015/0234308 A1 | 8/2015 | Lim et al. | |

(56) References Cited

U.S. PATENT DOCUMENTS

| | | | |
|---|---|---|---|
| 2015/0260843 A1 | 9/2015 | Lewis | |
| 2015/0301162 A1 | 10/2015 | Kim | |
| 2015/0371074 A1 | 12/2015 | Lin | |
| 2015/0378011 A1 | 12/2015 | Owechko | |
| 2016/0047895 A1 | 2/2016 | Dussan | |
| 2016/0047896 A1 | 2/2016 | Dussan | |
| 2016/0047903 A1* | 2/2016 | Dussan | G01S 7/4817 356/5.01 |
| 2016/0138944 A1 | 5/2016 | Lee et al. | |
| 2016/0178749 A1 | 6/2016 | Lin et al. | |
| 2016/0200161 A1 | 7/2016 | Van Den Bossche et al. | |
| 2016/0245902 A1 | 8/2016 | Watnik et al. | |
| 2016/0280229 A1* | 9/2016 | Kasahara | H04N 5/2354 |
| 2016/0291160 A1 | 10/2016 | Zweigle et al. | |
| 2016/0357187 A1 | 12/2016 | Ansari | |
| 2016/0363669 A1 | 12/2016 | Liu | |
| 2016/0380488 A1 | 12/2016 | Widmer | |
| 2017/0023678 A1* | 1/2017 | Pink | G01S 17/931 |
| 2017/0090013 A1 | 3/2017 | Paradie et al. | |
| 2017/0102457 A1 | 4/2017 | Li | |
| 2017/0199273 A1 | 7/2017 | Morikawa et al. | |
| 2017/0219696 A1* | 8/2017 | Hayakawa | G01S 17/87 |
| 2017/0269215 A1 | 9/2017 | Hall et al. | |
| 2017/0270381 A1* | 9/2017 | Itoh | B60S 1/0844 |
| 2017/0285346 A1 | 10/2017 | Pan | |
| 2017/0307736 A1 | 10/2017 | Donovan | |
| 2017/0307737 A1* | 10/2017 | Ishikawa | G01S 7/4815 |
| 2017/0310948 A1 | 10/2017 | Pei | |
| 2017/0329010 A1 | 11/2017 | Warke et al. | |
| 2017/0329011 A1 | 11/2017 | Warke et al. | |
| 2018/0052378 A1 | 2/2018 | Shin et al. | |
| 2018/0113193 A1 | 4/2018 | Huemer | |
| 2018/0128903 A1 | 5/2018 | Chang | |
| 2018/0136328 A1 | 5/2018 | Moss | |
| 2018/0143309 A1 | 5/2018 | Pennecot et al. | |
| 2018/0180718 A1 | 6/2018 | Lin | |
| 2018/0224529 A1 | 8/2018 | Wolf et al. | |
| 2018/0241477 A1 | 8/2018 | Turbide et al. | |
| 2018/0284237 A1* | 10/2018 | Campbell | G01S 17/42 |
| 2018/0284282 A1 | 10/2018 | Hong et al. | |
| 2018/0284286 A1 | 10/2018 | Eichenholz | |
| 2018/0286909 A1 | 10/2018 | Eichenholz et al. | |
| 2018/0306913 A1 | 10/2018 | Bartels | |
| 2018/0341009 A1 | 11/2018 | Niclass et al. | |
| 2018/0364334 A1 | 12/2018 | Xiang et al. | |
| 2018/0372870 A1 | 12/2018 | Puglia | |
| 2019/0018143 A1 | 1/2019 | Thayer et al. | |
| 2019/0101644 A1 | 4/2019 | DeMersseman et al. | |
| 2019/0123508 A1 | 4/2019 | Hong et al. | |
| 2019/0129009 A1 | 5/2019 | Eichenholz et al. | |
| 2019/0139951 A1 | 5/2019 | T'Ng et al. | |
| 2019/0146060 A1 | 5/2019 | Qiu et al. | |
| 2019/0195990 A1 | 6/2019 | Shand | |
| 2019/0235064 A1 | 8/2019 | Droz et al. | |
| 2020/0081129 A1 | 3/2020 | de Mersseman | |
| 2020/0088847 A1 | 3/2020 | DeMersseman et al. | |
| 2020/0249354 A1 | 8/2020 | Yeruhami et al. | |
| 2020/0341120 A1 | 10/2020 | Ahn | |
| 2020/0341121 A1 | 10/2020 | Ahn | |
| 2021/0018602 A1 | 1/2021 | de Mersseman et al. | |

FOREIGN PATENT DOCUMENTS

| | | |
|---|---|---|
| DE | 102004033944 A1 | 2/2006 |
| DE | 102006031114 A1 | 1/2008 |
| DE | 102008045387 A1 | 3/2010 |
| DE | 102014218957 A1 | 3/2016 |
| DE | 102015217908 A1 | 3/2017 |
| EP | 0112188 A2 | 6/1984 |
| EP | 0578129 A2 | 1/1994 |
| EP | 2696166 A2 | 2/2014 |
| EP | 2824418 A1 | 1/2015 |
| EP | 3147685 A1 | 3/2017 |
| EP | 3203259 A1 | 8/2017 |
| EP | 3457080 A1 | 3/2019 |
| WO | 1994019705 A1 | 9/1994 |
| WO | 2008/008970 A2 | 1/2008 |
| WO | 2015/014556 A2 | 2/2015 |
| WO | 2016072483 A1 | 5/2016 |
| WO | 2016/097409 A2 | 6/2016 |
| WO | 2016204139 A1 | 12/2016 |
| WO | 2019050643 A1 | 3/2019 |
| WO | 2019099166 A1 | 5/2019 |

OTHER PUBLICATIONS

International Search Report and Written Opinion for International Application No. PCT/US2018/057676, dated Jan. 23, 2019.

International Search Report and Written Opinion for International Application No. PCT/US2018/052849, dated May 6, 2019.

International Search Report and Written Opinion for International Application No. PCT/US2019/046800, dated Nov. 25, 2019.

Church et al., "Evaluation of a steerable 3D laser scanner using a double Risley prism pair," SPIE Paper.

Luhmann, "A historical review on panorama photogrammetry," http://www.researchgate.net/publication/228766550.

International Search Report and Written Opinion for International Application No. PCT/US2020/039760, dated Sep. 18, 2020.

International Search Report and Written Opinion in corresponding International Application No. PCT/US2018/057727, dated Jan. 28, 2019; 12 pages.

International Search Report and Written Opinion in corresponding International Application No. PCT/US2018/052837, dated Jan. 24, 2019; 13 pages.

Skolnik, M.I., Introduction to Radar Systems, 3rd Edition, pp. 45-48, McGraw-Hill, New York, NY 2001; 6 pages.

Range-Doppler image processing in linear FMCW Radar and FPGA Based Real-Time Implementation, Journal of Communication and Computer, vol. 6, No. 4, Apr. 2009.

Invitation to Pay Additional Fees dated Mar. 8, 2019 in PCT/US2018/052849.

Kasturi et al., UAV-Borne LiDAR with MEMS Mirror Based Scanning Capability; SPIE Defense and Commercial Sensing Conference 2016; Apr. 20, 2016; Baltimore, MD; 10 pages.

Internet URL: https://www.continental-automotive.com/en-gl/Passenger-Cars/Chassis-Safety/Advanced-Driver-Assistance-Systems/Cameras [retrieved on Dec. 20, 2018].

Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].

Roncat, Andreas, The Geometry of Airborne Laser Scanning in a Kinematical Framework, Oct. 19, 2016 [retrieved on Dec. 19, 2018] Retrieved from the Internet URL: https://www.researchgate.net/profile/Andreas_Roncat/publication/310843362_The_Geometry_of_Airborne_Laser_Scanning_in_a_Kinematical_Framework/links/5839add708ae3a74b49ea03b/The-Geometry-of-Airborne-Laser-Scanning-in-a-Kinematical-Framework.pdf.

Internet URL: http://www.advancedscientificconcepts.com/products/overview.html [retrieved on Dec. 20, 2018].

Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.

A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_laser_sensors_in_self-driving_cars.jsp.

Hewlett-Packard Application Note 77-4, Swept-Frequency Group Delay Measurements, Hewlett-Packard Co., Sep. 1968, 7 pages.

Kravitz et al., High-Resolution Low-Sidelobe Laser Ranging Based on Incoherent Pulse Compression, IEEE Photonics Technology Letters, vol. 24, No. 23, Dec. 1, 2012, pp. 2119-2121.

(56) References Cited

OTHER PUBLICATIONS

Journet et al., A Low-Cost Laser Range Finder Based on an FMCW-like Method, IEEE Transactions on Instrumentation and Measurement, Aug. 2000, vol. 49, No. 4, pp. 840-843.

Campbell et al., Advanced Sine Wave Modulation of Continuous Wave Laser System for Atmospheric CO2 Differential Absorption Measurements; NASA Langley Research Center; 32 pages [retrieved on Dec. 20, 2018].

Levanon et al., Non-coherent Pulse Compressio—Aperiodic and Periodic Waveforms; The Institution of Engineering and Technology, 2015; 9 pages.

Peer et al., Compression Waveforms for Non-Coherent Radar, Tel Aviv University; 6 pages [retrieved on Dec. 20, 2018].

Li, Larry, Time-of-Flight Camera—An Introduction, Technical White Paper, SLOA190B, Texas Instruments; Jan. 2014; 10 pages.

Pierrottet et al., Linear FMCW Laser Radar for Precision Range and Vector Velocity Measurements, Coherent Applications, Inc.; NASA Langley Research Center; 9 pages [retrieved on Dec. 20, 2018].

Kahn, Joseph M., Modulation and Detection Techniques for Optical Communication Systems, Stanford University, Department of Electrical Engineering, 2006; 3 pages.

Niclass et al., Development of Automotive LIDAR, Electronics and Communications in Japan, vol. 98, No. 5, 2015; 6 pages.

International Search Report and Written Opinion in corresponding PCT Application No. PCT/US2017/033271, International Filing Date May 18, 2017; dated Sep. 1, 2017.

Su et al, 2-D FFT and Time-Frequency Analysis Techniques for Multi-Target Recognition of FMCW Radar Signal, Proceedings of the Asia-Pacific Microwave Conference 2011, pp. 1390-1393.

Wojtkiewicz et al, Two-Dimensional Signal Processing in FMCW Radars, Instytut Podstaw Elektroniki Politechnika Warszawska, Warszawa; 6 pages [retreived on Dec. 20, 2018].

Winkler, Volker, Range Doppler Detection for Automotive FMCW Radars, Proceedings of the 4th European Radar Conference, Oct. 2007, Munich Germany; 4 pages.

Li et al., Investigation of Beam Steering Performances in Rotation Risley-Prism Scanner, Optics Express, Jun. 13, 2016, vol. 24, No. 12; 11 pages.

THORLABS Application Note, Risley Prism Scanner; 33 pages [retrieved on Dec. 20, 2018].

Simpson et al., Intensity-Modulated, Stepped Frequency CW Lidar for Distributed Aerosol and Hard Target Measurements, Applied Optics, Nov. 20, 2005, vol. 44, No. 33, pp. 7210-7217.

International Search Report and Written Opinion in corresponding International Application No. PCT/US2017/033263, dated Aug. 29, 2017; 13 pages.

International Search Report and Written Opinion in corresponding International Application No. PCT/US2017/033265, dated Sep. 1, 2017; 15 pages.

International Search Report and Written Opinion in corresponding International Application No. PCT/US2018/054992, dated Dec. 11, 2018; 12 pages.

International Search Report and Written Opinion in corresponding International Application No. PCT/US2018/049038, dated Dec. 12, 2018; 13 pages.

International Search Report and Written Opinion in corresponding International Application No. PCT/US2018/048869, dated Nov. 8, 2018; 14 pages.

International Search Report and Written Opinion in corresponding International Application No. PCT/US2018/051281, dated Nov. 22, 2018; 14 pages.

Communication from EP Application No. 18773034.6 dated Sep. 13, 2021.

\* cited by examiner

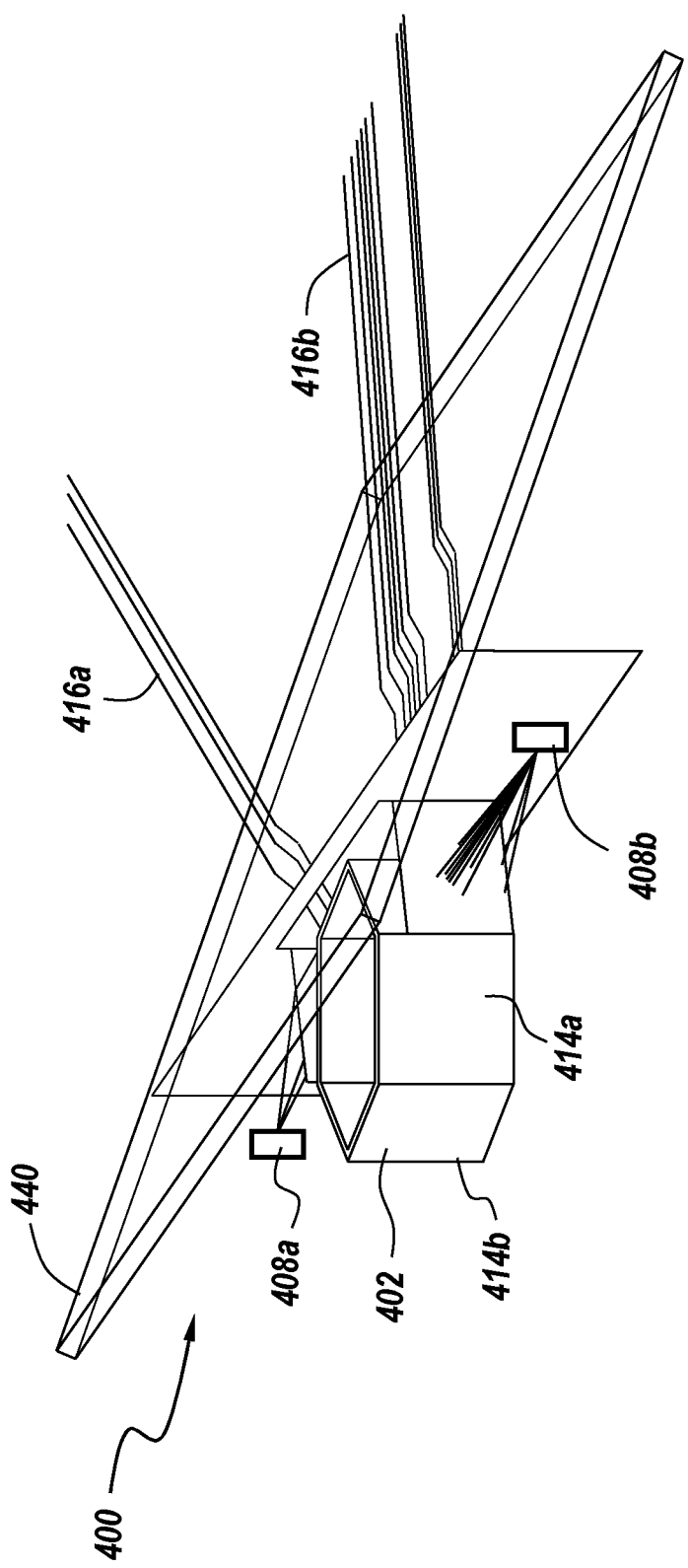

DETECTION SYSTEM WITH REFLECTIVE MEMBER ILLUMINATED FROM MULTIPLE SIDES

CROSS REFERENCE TO RELATED APPLICATIONS

This application claims priority to and the benefit of U.S. Provisional Patent Application No. 62/565,373, filed on Sep. 29, 2017 and titled "LIDAR PYRAMID SCANNER CONFIGURATION WITH DIFFERENT SLOPES ON THE PYRAMID AND ILLUMINATED FROM AN ANGLE BELOW", the contents of which are incorporated herein by reference as though fully set forth herein. Further, this application claims priority to and the benefit of U.S. Provisional Patent Application No. 62/594,284, filed on Dec. 4, 2017 and titled "LIDAR POLYGON SCANNER CONFIGURATION HAVING DIFFERENTLY SLOPED POLYGON SIDES ILLUMINATED FROM MULTIPLE SIDES", the contents of which are incorporated herein by reference as though fully set forth herein.

FIELD OF THE INVENTION

The subject disclosure relates to object detection and more particularly to detection systems for vehicles using rotating reflective members.

BACKGROUND OF THE INVENTION

Vehicles often include detection systems which can be used for collision avoidance, self-driving, cruise control, and the like. For an effective detection system, it is important to combine a wide field of view in both the horizontal and vertical direction with long range and high resolution. However, limited space and cost considerations can often limit the range and/or resolution of a detection system. Further, an individual vehicle can have limited space for placing the components of detection systems and an excessive amount of components can be unappealing esthetically.

SUMMARY OF THE INVENTION

In light of the needs described above, in at least one aspect, there is a need for a compact and cost effective vehicle detection system that has a large field of view, long range, and high resolution in a compact detection system.

In at least one aspect, the subject technology relates to a detection system for a vehicle in an environment. The detection system includes at least one reflective member having a rotational axis and a plurality of reflective sides, each of the reflective sides sloping towards the rotational axis at a slope angle different than the slope angle of at least one of the others of the reflective sides. The detection system also has a plurality of LiDAR systems including at least one light transmitter and at least one light receiver, each LiDAR system interacting with a different one of the reflective sides to scan the environment.

In at least one aspect, the subject technology relates to a detection system for a vehicle in an environment. The detection system includes a reflective member having a rotational axis and a plurality of reflective sides, each of the reflective sides sloping towards the rotational axis at a slope angle different than the slope angle of at least one of the others of the reflective sides. Further, a first LiDAR system has at least one first light transmitter and at least one first light receiver, the first LiDAR system configured to interact with a first active side of the plurality of reflective sides. A second LiDAR system has at least one second light transmitter and at least one second light receiver, the second LiDAR system configured to interact with a second active side of the plurality of reflective sides. An actuator configured to rotate the reflective member to change the first active reflective side to a first different one of the plurality of reflective sides and to change the second active reflective side to a different one of the plurality of reflective sides.

In some embodiments, the first LiDAR system is configured to interact with the first active side to scan, in azimuth, a first zone and a second zone, the first zone being at least partially to a first side of the vehicle and the second zone being at least partially in front of the vehicle. Further, the second LiDAR system is configured to interact with the second active side to scan, in azimuth, the second zone and a third zone, the third zone being at least partially to a second side of the vehicle. The vehicle can include a windshield having an upper portion, a central portion, and a lower portion, and the reflective member can be positioned proximate to the upper portion. In some cases, the first LiDAR system and the second LiDAR system are positioned proximate to the upper portion. A first upper reflective mirror can be coupled to the upper portion of the windshield. A first lower reflective mirror can be offset from the windshield. The first upper reflective mirror can direct a field of view of the first LiDAR system between the reflective member and first lower reflective mirror. The first lower reflective mirror can direct the field of view of the first LiDAR system between the first upper reflective mirror and the environment. In some cases, a second upper reflective mirror coupled to the upper portion of the windshield and a second lower reflective mirror offset from the windshield. The second upper reflective mirror can direct a field of view of the second LiDAR system between the reflective member and the second lower reflective mirror. Further, the second lower reflective mirror directs the field of view of the second LiDAR system between the second upper reflective mirror and the environment.

In some embodiments, the system can also include an upper reflective mirror coupled, and parallel, to the upper portion of the windshield. A lower reflective mirror can be coupled to, and offset from, the windshield. Further, the upper reflective mirror can direct a field of view of the first and second LiDAR systems between the reflective member and the lower reflective mirror. The lower reflective mirror can then direct the field of view of the first and second LiDAR systems between the upper reflective mirror and the environment. In some embodiments, the light transmitters of the first LiDAR system and the second LiDAR system transmit p-polarized light beams, the lower reflective mirror directing the light beams from the first and second LiDAR systems to pass through the windshield. The light beams from the first LiDAR system and the second LiDAR system can be directed through the windshield within 10 degrees of a Brewster angle for the windshield. In some cases, a prism is positioned on the inside of the upper portion of the windshield, the prism configured to direct p-polarized transmitted light beams from at least one of the first and second LiDAR systems through the windshield and into the environment. The prism can also be configured such that the transmitted light beams are directed through the windshield within 10 degrees of a Brewster angle for the windshield.

In some embodiments, the slope of each reflective side differs incrementally by between 2 and 8 degrees. In other cases, the slope of each reflective side differs incrementally by between 0.2 and 0.4 degrees. In some embodiments, the slope of each reflective side differs from the slope of one of the directly adjacent reflective sides by substantially the same degree. In some cases, the reflective member includes 5 or 6 reflective sides.

In some embodiments, the at least one first light transmitter includes an array of light transmitters configured to transmit light beams to the first active side in a column parallel to the rotational axis. In some cases, the slope angle of each of the reflective sides is different than the slope angle of each of the others of the reflective sides.

In at least one aspect, the subject technology relates to a detection system for a vehicle in an environment. The system includes a first reflective member having a first rotational axis, the first reflective member having a plurality of reflective sides, each of the reflective sides sloping towards the first rotational axis at a slope angle different than the slope angle of at least one of the others of the reflective sides of the first reflective member. A second reflective member has a second rotational axis offset from the first rotational axis, the second reflective member having a plurality of reflective sides, each of the reflective sides sloping towards the second rotational axis at a slope angle different than the slope angle of at least one of the others of the reflective sides of the second reflective member. The system includes a first LiDAR system with at least one first light transmitter and at least one first light receiver, the first LiDAR system configured to interact with an active side of the plurality of reflective sides of the first reflective member. The system also includes a second LiDAR system with at least one second light transmitter and at least one second light receiver, the second LiDAR system configured to interact with an active side of the plurality of reflective sides of the second reflective member. At least one actuator is configured to rotate the reflective members to change the active reflective side of each reflective member to a different one of the plurality of reflective sides.

In some embodiments, the first LiDAR system is positioned on a first half of the vehicle and the second LiDAR system is positioned on a second half of the vehicle. The first LiDAR system can be positioned proximate to a first headlight of the vehicle and the second LiDAR system can be positioned proximate to a second headlight of the vehicle. In some cases, the first LiDAR system is configured to interact with the active side of the first reflective member to scan, in azimuth, a first zone and a second zone, the first zone being to the first side of the vehicle and the second zone being in front of the vehicle. In some embodiments, the second LiDAR system is configured to interact with the active side of the second reflective member to scan, in azimuth, the second zone and a third zone, the third zone being at least partially to the second side of the vehicle. Additionally, the first LiDAR system and the second LiDAR system can have an overlapping field of view in the second zone.

BRIEF DESCRIPTION OF THE DRAWINGS

So that those having ordinary skill in the art to which the disclosed system pertains will more readily understand how to make and use the same, reference may be had to the following drawings.

FIG. 4a is a perspective view of select components of an embodiment of a detection system in accordance with the subject technology

FIG. 5b is a side view of a LiDAR system of the detection system of FIG. 5a.

FIG. 11b is a side view showing exemplary scan zones produced by the reflective member of FIG. 11a.

FIG. 12b is a side view showing exemplary scan zones produced by the reflective member of FIG. 12a.

DETAILED DESCRIPTION

Figure 1:
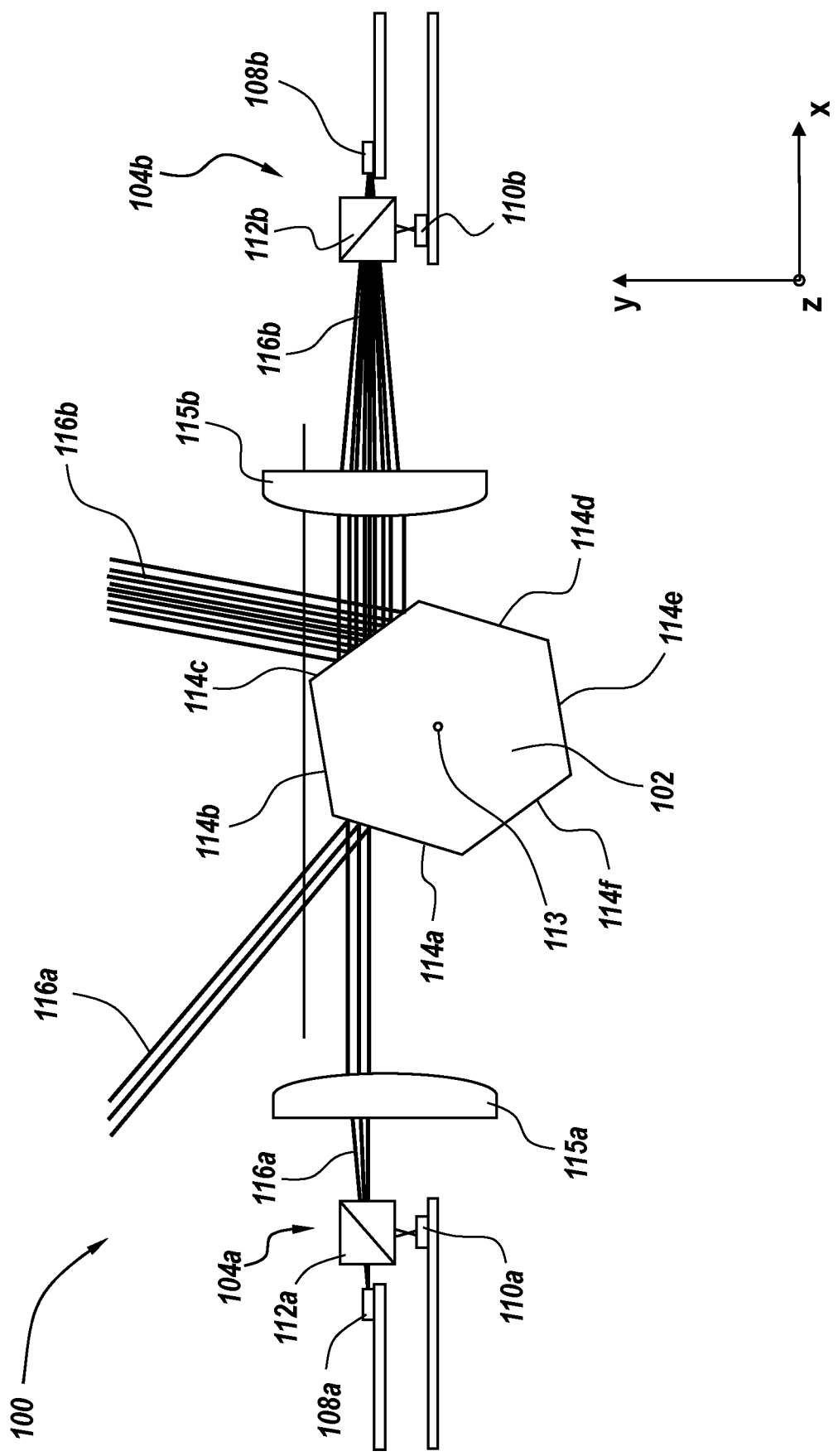
FIG. 1 is an overhead view of a detection system for a vehicle in accordance with the subject technology.

The subject technology overcomes many of the prior art problems associated with vehicle detection systems. In brief summary, the subject technology provides a detection system that combines rotating at least one reflective member which interacts with a plurality of offset LiDAR arrays to yield a good field of view and good range and resolution. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top). Further, similar components in separate systems are at times referred to herein with suffixes to denote their particular system (i.e. 104a and 104b) while all components of a given type are referred to generally without a suffix (i.e. 104).

Referring now to FIG. 1, a detection system for a vehicle in accordance with the subject technology is shown generally at 100. The detection system 100 can be mounted on or within a vehicle (not distinctly shown) and can be used generally to gather information and generate data on the surrounding environment. The detection system 100 includes a reflecting member 102 which interacts with two separate LiDAR systems 104a, 104b to view objects in the environment around the vehicle. Each LiDAR system 104 includes the necessary components for target detection using LiDAR as are found in typical LiDAR systems known in the art. Some such components are omitted herein for simplicity. In the embodiment of FIG. 1, each LiDAR system 104a, 104b has a detector array with light transmitter arrays 108a, 108b and light receivers 110a, 110b, beam splitters 112a, 112b, and lenses 115a, 115b, as discussed in more detail below. Each light transmitter 108a, 108b array is configured to transmit a one or more corresponding light beams 116a, 116b. The light transmitters 108 can include laser diodes configured to generate pulsed lasers or light beams 116 for reflection off objects within the environment, or other similar known transmitter for a LiDAR system 104. It should be noted that while two separate LiDAR systems 104a, 104b are provided, these systems 104 are separate in that they can individually illuminate a portion of the environment and generate LiDAR data. However, as shown in FIG. 1, they are part of the same detection system 100 and therefore information from both LiDAR systems 104 can be provided into the detection system 100 to make a final determination of the position of objects within the environment.

The light receivers 110a, 110b of each LiDAR system 104a, 104b are configured to receive the light from respective light beams 116a, 116b after the beams 116 have reflected off an object within the environment. The light receivers 110 are optical detection devices, or sensors, as are known for detecting light in LiDAR systems. In some cases, only one light receiver 110 is used. However the embodiments shown relate to light receivers 110 arranged in a column or array. In some cases each light receiver 110 can be arranged to correspond to one other light transmitter with the array of light transmitters 108. In such a case, the receiver 110 receives a light beam 116 from the corresponding light transmitter after the light beam 116 has reflected off an object in the environment. After receipt by the receivers 110, reflected light beams 116 are converted into electrical signals. Processing circuitry (not distinctly shown) then processes and stores data related to the objects within the environment based on the electrical signals. In particular, the LiDAR systems 104 generates 3D range data on objects within the environment surrounding the vehicle.

The detection system 100 includes a single reflective member 102 which is shared by both LiDAR systems 104, and facilitates interaction between the LiDAR systems 104 and the environment. The reflective member 102 has a plurality of reflective sides 114a-f formed from reflective metal (or other reflective material). The reflective sides 114 deflect light beams 116 from the light transmitter arrays 108 into the environment. Similarly, after the transmitter light beams 116 reflect off objects in the environment, the reflective member 102 deflects the returning light beams back towards the LiDAR systems 104 for eventual receipt by the receivers 110. An actuator (not distinctly shown), such as a shaft and motor assembly or brushless motor inside the reflective member 102, rotates the reflective member 102 around a rotational axis 113 to change the field of view of the LiDAR systems 104. In particular, the reflective sides 114 of the reflective member 102 slope in the direction of the z-axis and slope towards the rotational axis 113 of the reflective member 102 (which is parallel to the z axis). Each reflective side 114 slopes at a different angle than the others of the reflective sides 114 such that the LiDAR system 104 canvases a different field of view when reflecting off each of the reflective sides 114. Notably, in other embodiments, each reflective side 114 slopes at a slope angle different than one, but not all, of the other reflective sides 114.

Notably, the terms "lens" or "lenses" are used throughout and it should be understood that each lens 115 may have several pieces of glass of differing shapes, thickness, and/or curvature. The term "lens" is not limited to a single piece of glass. In general, the lens 115 acts as a collimating lenses to orient the transmitted (and returning) light beams 116.

The beam splitters 112 can be one of the many types of known beam splitters, such as wavelength dependent or polarized. Whether the light is reflected or allowed to pass through the beam splitters 112 can be based on a certain property of the light, such as wavelength. In other cases, the beam splitters 112 can simply reflect a portion of all light that hits it while allowing a portion of the light to pass through. In general, the beam splitters 112 are arranged to maximize the amount of outgoing light that is allowed to pass from light beams 116 from the light transmitters 108 while also maximizing the amount of returning light that is deflected to the receivers 110.

Still referring to FIG. 1, employing multiple LiDAR systems 104 ensures that multiple different sides 114 of the reflective member 102 are simultaneously illuminated, providing the detection system 100 with real time feedback at different areas of the environment in both azimuth and elevation directions. Additionally, each LiDAR system 104 is positioned and/or angled to scan a different area of the surrounding environment in azimuth (as well as in elevation if so desired), as shown and discussed in more detail below. Therefore providing two LiDAR systems 104 acting on a single reflective member 102 allows for greater field of view of the detection system 100 without requiring additional reflective members 102 located at different areas of the vehicle and actuated with multiple motors. This makes the system 100 cost efficient while not taking up valuable space on the vehicle.

Figure 2:
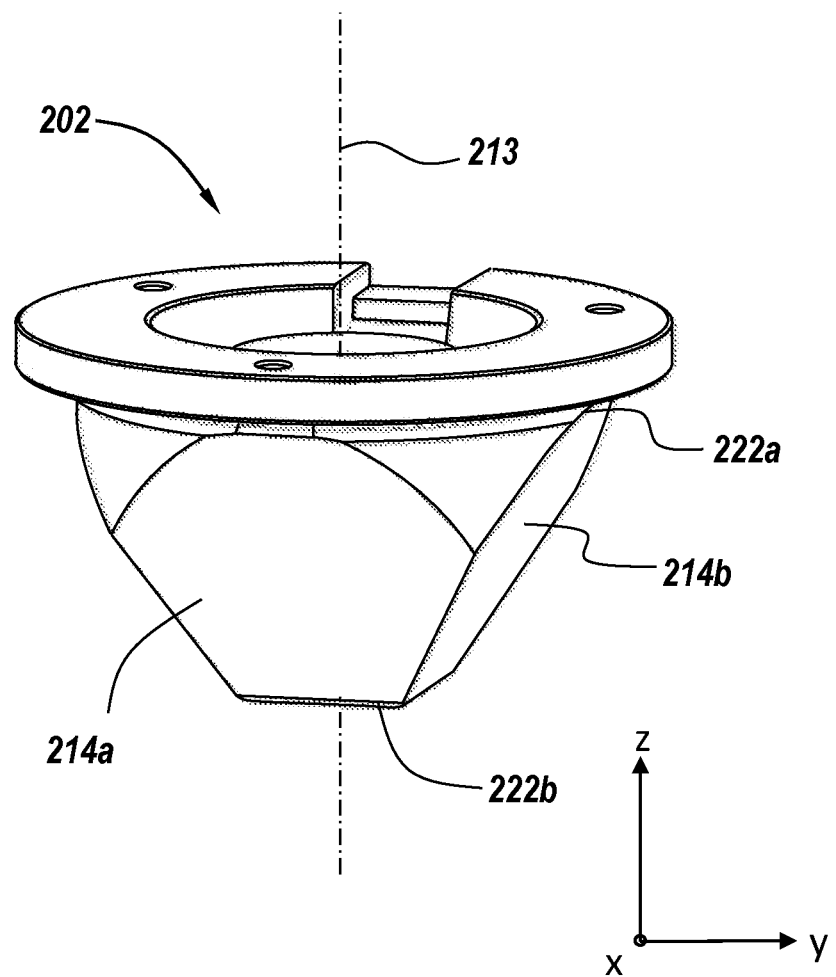
FIG. 2 is a perspective view of a reflective member for a detection system for a vehicle in accordance with the subject technology.

Referring now to FIG. 2, a perspective view of a reflective member 202 is shown, the other components of the corresponding detection system having been omitted for simplicity. The reflective member 202 can function within a detection system similar to the reflective member 102 discussed above. In the embodiment of FIG. 2, the reflective member 202 has four sides 214, although only a first side 214a and second side 214b are shown. Each of the sides 214, including the sides 214 not shown, extend from the wide end 222a of the reflective member 202 to the narrow end 222b, sloping towards the rotational axis 213. An actuator (not shown) rotates the reflective member 202 around the rotational axis 213, changing the field of view of light transmitters interacting with the sides 214 and causing each of the sides 214 to interact with different LiDAR systems with different sets of light transmitters in turn. It should be noted that the four sided reflective member 202, is exemplary only, and in different embodiments reflective members can have other numbers of sides, such as five or six sides. Further, the top and bottom sides need not be narrow and wide specifically (i.e. like wide end 222a and narrow end 222b), as with the reflective member 202. In other embodiments, both ends 222a, 222b can be of a similar width.

Figure 3:
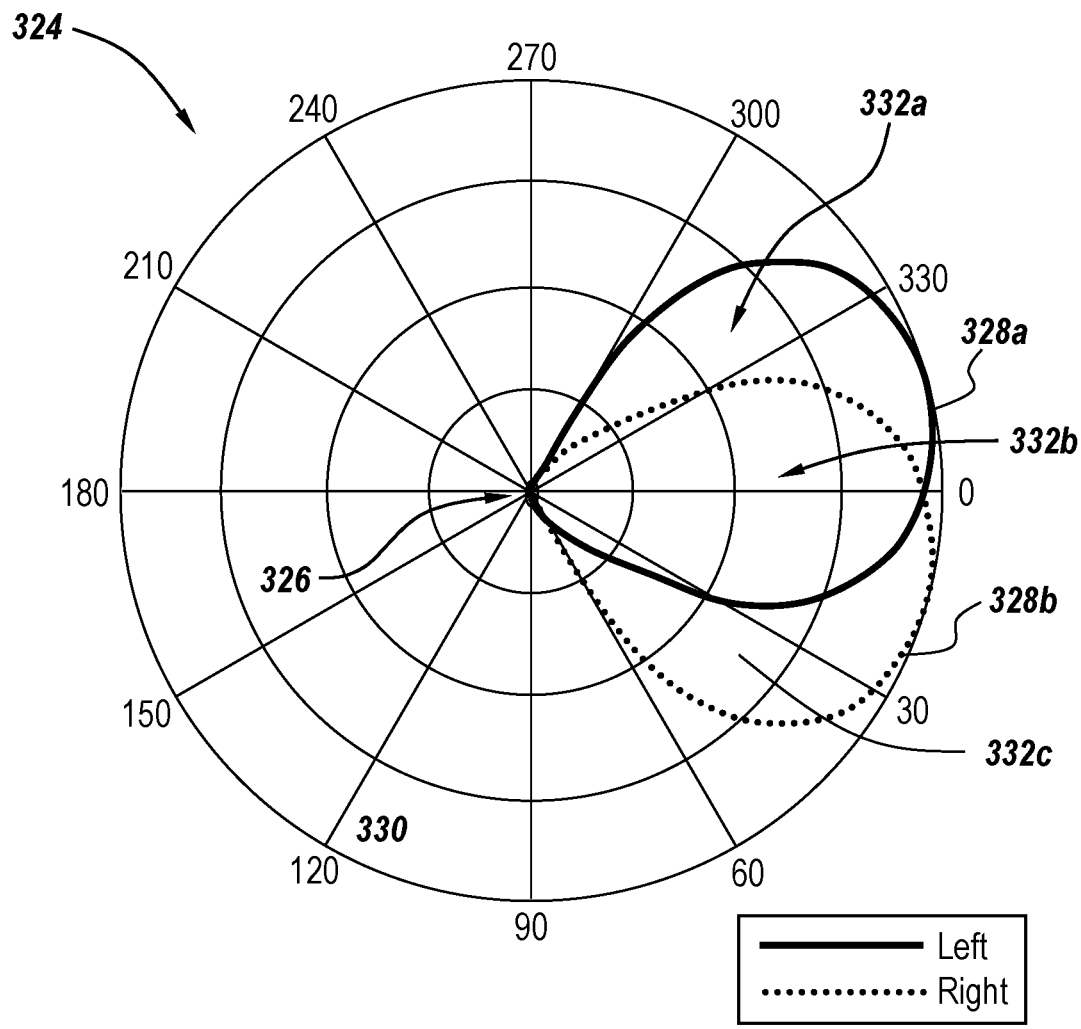
FIG. 3 is an overhead graph of an exemplary field of view of a detection system for a vehicle in accordance with the subject technology.

Referring now to FIG. 3, an overhead view of a graph 324 depicting an exemplary azimuth field of view of a detection system configured in accordance with the detection system 100 is shown. In general, as a LiDAR system scans the zones within the environment, the field of views shown herein are generated. The vehicle 326 is represented in block form at the center of the graph 324, the surrounding area 330 representing the surrounding environment. A first azimuth field of view 328a is depicted, representing the field of view of the first LiDAR system 104a. A second azimuth field of view 328b represents the field of view of the second LiDAR system 104b. In the example given in FIG. 3, it is assumed that the detection system 100 is located on the front of the vehicle 326, with the first LiDAR system 104a on the left side and the second LiDAR system 104b on the right side. However, the detection system 100 and LiDAR systems 104 can be arranged virtually anywhere on the vehicle 326 in other embodiments to focus on a desired field of view. The first field of view 328a and the second field of view 328b provide an overlapping field of view at a central scanning area 332b. This results in the detection system 100 having the greatest resolution directly in front of the vehicle 326. The first LiDAR system 104a positioned on the left also exclusively scans a left scanning area 332a while the second LiDAR system 104b positioned on the right exclusively scans a right scanning area 332c. In this way, the outer scanning areas 332a, 332c provide an increased field of view for the detection system, while the central area 332b allows for improved resolution in the area of greatest concern (the central areas 332b being scanned by both LiDAR systems 104a, 104b). Overall, the system 100 provides greater than 120 degree coverage in the azimuth direction. Notably, adding more sides to the reflective member 102 can increase the vertical resolution but reduce horizontal field of view. In some cases, a 5-6 sided reflective member 102 has been found to provide an effective balance of resolution and field of view.

Figure 4B:
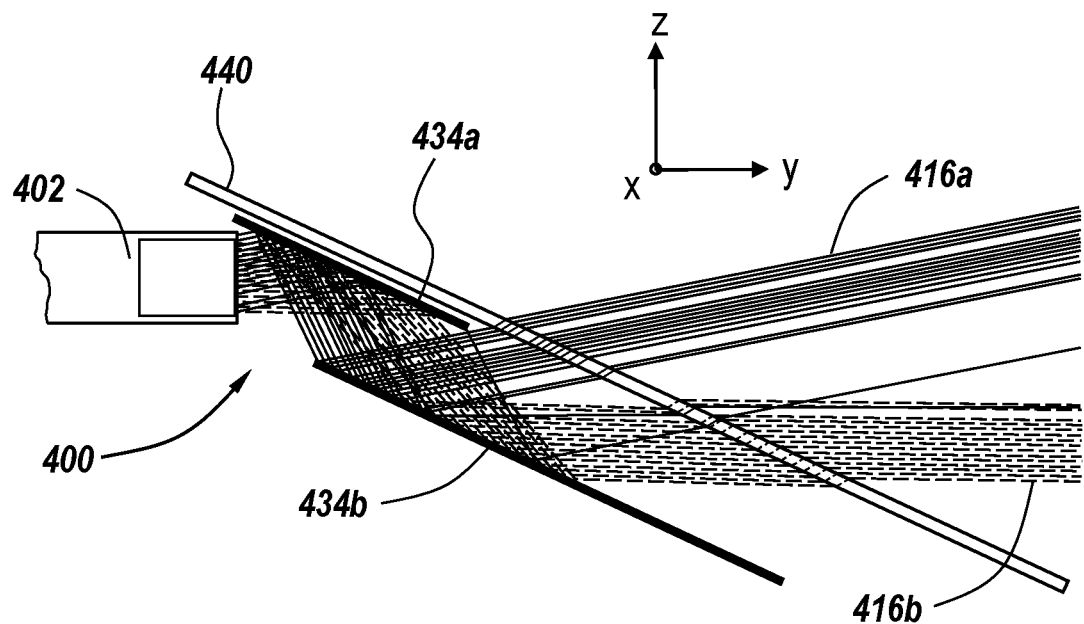
FIG. 4b is a side view of a system, similar to the system of FIG. 4a in a first position.
Figure 4C:
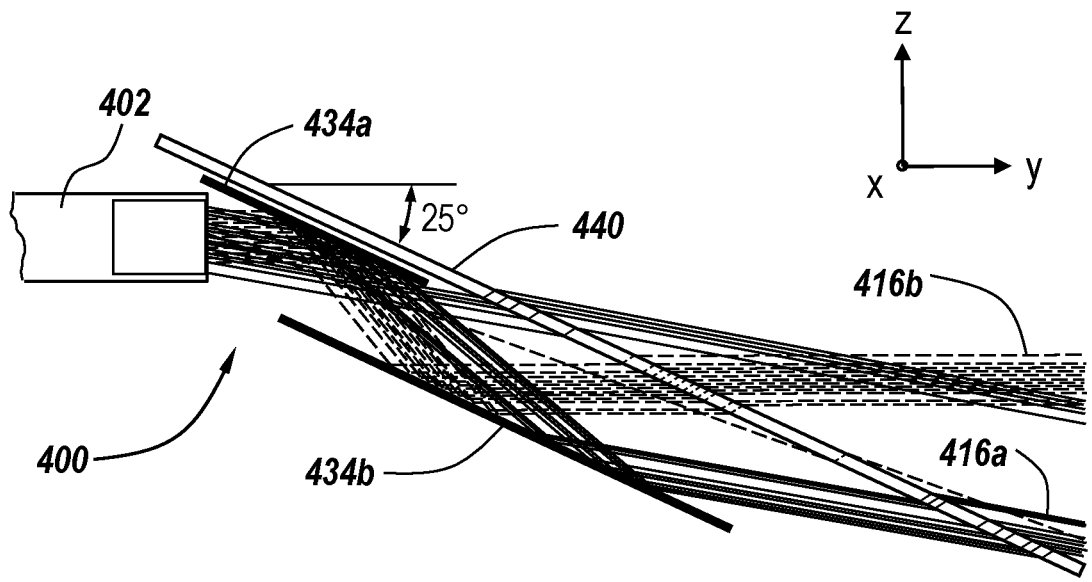
FIG. 4c is a side view of the system of FIG. 4b in a second position.
Figure 4D:
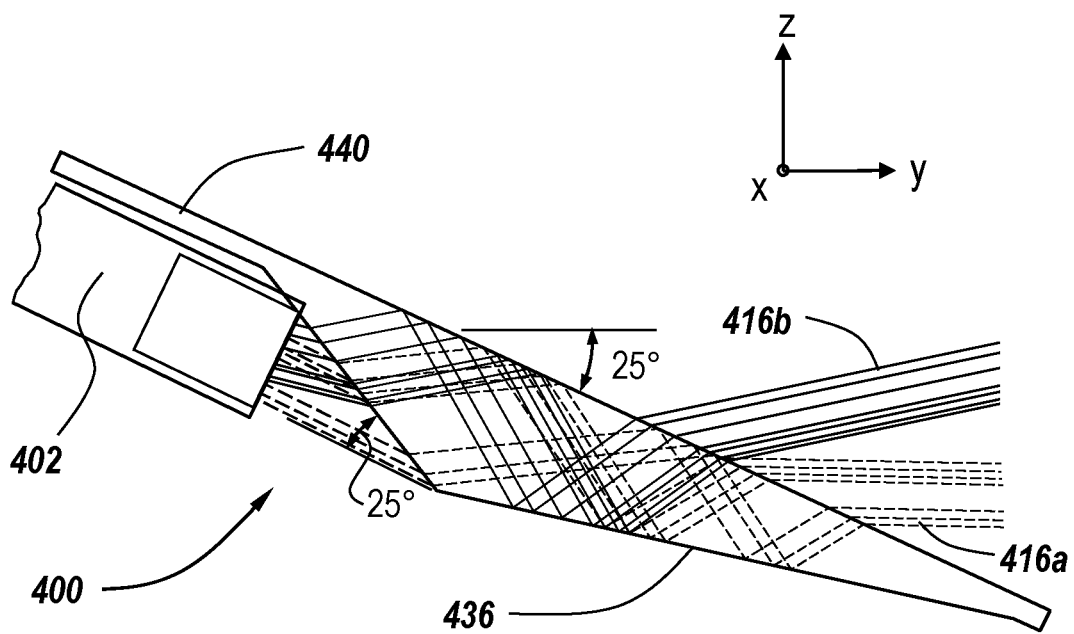
FIG. 4d is a side view of select components of an embodiment of a detection system in accordance with the subject technology in a first position.
Figure 4E:
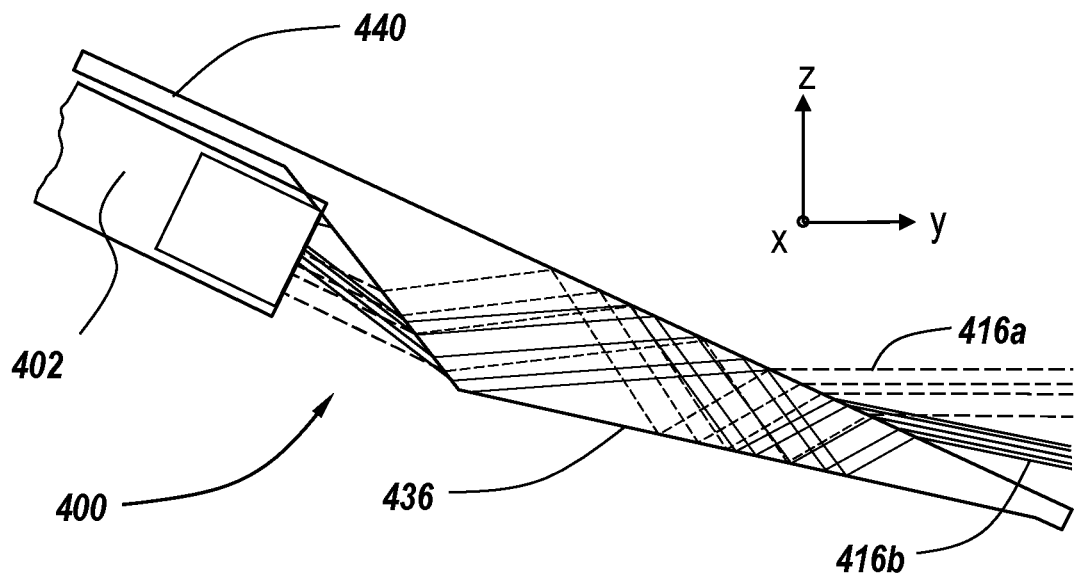
FIG. 4e is a side view of the system of FIG. 4d in a second position.

Referring now to FIGS. 4a-4e, exemplary embodiments of a detection system 400, similar to the detection system 100 are shown. In particular, FIG. 4a shows a perspective view of the detection system 400 with a reflective member 402 positioned proximate to an upper portion of the windshield 440. FIGS. 4b-4c show side views of an embodiment where the detection system 400 incorporates reflective mirrors 434 to direct the transmitted light beams 416 out of the windshield 440 and into the environment. On the other hand, FIGS. 4d-4e show side views of an embodiment where the detection system 400 incorporates prisms 436 to deflect the transmitted light beams 416 out of the windshield 440 and into the environment. Notably, as used herein, the "upper portion of the windshield 440" describes the topmost portion of the windshield 440 with respect to the windshield's 440 normal orientation to the ground, as opposed to a lower portion or a central portion. Specifically, the upper portion generally includes the top third of the windshield 440. It should be understood that whenever components are described as proximate to the upper portion of the windshield 440, they can be positioned next to the upper portion of the windshield 440 such that they interact with that portion of the windshield 440. For example, when the reflective member 402 is proximate to the upper portion of the windshield 440, the reflective member 402 can be fixed to a ceiling of the vehicle, such that the reflective member 402 is at a shared elevation with the topmost portion of the windshield 440 (or the upper portion).

Referring now to FIG. 4a, a reflective member 402 for the detection system 400 contains a number of reflective sides 414 (specifically 6, in this case) and deflects transmitted light beams 416 from a first array of light transmitters 408a and a second array of light transmitters 408b through the windshield and into the surrounding environment. The reflective member 402 is positioned proximate to the upper portion of the windshield 440. The detection 400 also includes two LiDAR systems which are positioned proximate to the upper portion of the windshield 440, although for simplicity, only the light transmitters 408 from each of the LiDAR systems are shown. An actuator rotates the reflective member 402 which changes the angle of transmitted light beams 416 (and returning light beams) by changing which reflective side is active, changing the field of view of each corresponding LiDAR system. In some cases, two sides of the reflective member can have very large angles, such as substantially 10 degrees with respect to an origin angle, to obtain a wide field of view. Meanwhile, the other four sides can have relatively smaller slopes of, for example, substantially two degrees with respect to each other and/or with respect to the origin angle, to obtain more detailed information in the directly in front of the vehicle. The variation of these angles, which is described in more detail below, is directly related to the resulting field of view of the detection system.

Referring now to FIGS. 4b-4c, a side view of the system 400 of FIG. 4a is shown which incorporates reflective mirrors 434a, 434b. The upper reflective mirror 434a is coupled directly to the upper portion of the windshield 440, while the lower reflective mirror 434b is adjacent to, but offset from, the upper portion of the windshield 440. The transmitted light beams 416 deflect off the reflective member 402 and then deflect off the upper reflective mirror 434a initially, which directs the light beams 416 towards the lower reflective mirror 434b. In this way, the upper reflective mirror 434a directs the field of view of the LiDAR systems between the reflective member 402 and the lower reflective mirror 434b. The light beams 416 then deflect off the lower reflective mirror 434b, the majority of the light beams 416 then pass directly through the windshield 440 and into the environment. As such, the lower reflective member 434b directs the field of view of the LiDAR systems between the upper reflective mirror 434a and the environment. As the reflective member 402 rotates, different active reflective sides (e.g. 414 of FIG. 4a) of different slopes interact with each LiDAR system, and their field of view is changed. This difference can be seen in comparing FIG. 4b versus FIG. 4c which show the reflective member 402 in different rotational positions with different active reflective sides interacting with each system. This can be seen by the different angles and positions at which the transmitted light beams 416 pass through the windshield and into the environment, as between FIG. 4b and FIG. 4c.

In some cases, the upper reflective member 434a and lower reflective member 434b can be configured to direct the light beams 416 through the windshield 440 at an angle that minimizes reflection loss. In the example shown, this is done by orienting the upper reflective mirror 434a at an angle of substantially 25 degrees (i.e. +/−10%) with respect to the y-axis, the y-axis typically running parallel to the ground. The lower reflective mirror 434b is then placed parallel to, and offset from, the upper reflective mirror 434a, and adjusted until the majority of the light beams 416 passing through the windshield with low reflection losses. In some embodiments, reflection loss can be minimized by including light transmitters 408 which transmit p-polarized light beams 416 and/or configuring the mirrors 434 such that the light beams 416 are transmitted through the windshield 440 within 10 degrees of the Brewster's angle for the windshield 440.

Notably, in some embodiments, the system 400 can include two separate upper reflective mirrors 434*a* and two separate lower reflective mirrors 434*b*, each interacting exclusively with one of the LiDAR systems. Therefore each LiDAR system can have a separate upper reflective mirror 434*a* and separate lower reflective mirror 434*b* to direct the respective system's field of view with the environment.

Referring now FIGS. 4*d*-4*e*, similarly to the arrangement of system 400 of FIG. 4*a* is again shown from a side view, except instead of using upper and lower reflective mirrors 434 of FIGS. 4*b*-4*c*, prism 436 are used. One other difference is that reflective sides of the reflective member 402 are not parallel to the z-axis, but are instead parallel to the windshield (i.e. substantially at an angle of 25 degrees with respect to the y-axis). FIG. 4*d* and FIG. 4*e* (similarly to FIGS. 4*b* and 4*c*) represent two different positions of the reflective member 402. That is, different reflective sides 414 are interacting with each LiDAR system in FIG. 4*d* as compared to FIG. 4*e*. As a result, the light beams 416 are transmitted through the windshield 440 at different angles and at different positions as shown.

The prism 436 (or prisms) can be attached to, or even form a part of, the inside of the upper portion of the windshield 440. Much like the reflective mirrors 434 of FIGS. 4*b*-4*c*, the prism 436 can, in some cases, be adjusted such that the transmitted light beams 416 pass through the windshield 440 substantially at the Brewster's angle. The prisms 436 additionally (or alternatively) act to shift the transmitted light beams 416 vertically (down the z-axis) such that the light beams 416 pass through an area of the windshield 440 where the windshield wipers are expected to cover. This could be in the upper or central region of the windshield 440.

Figure 5A:
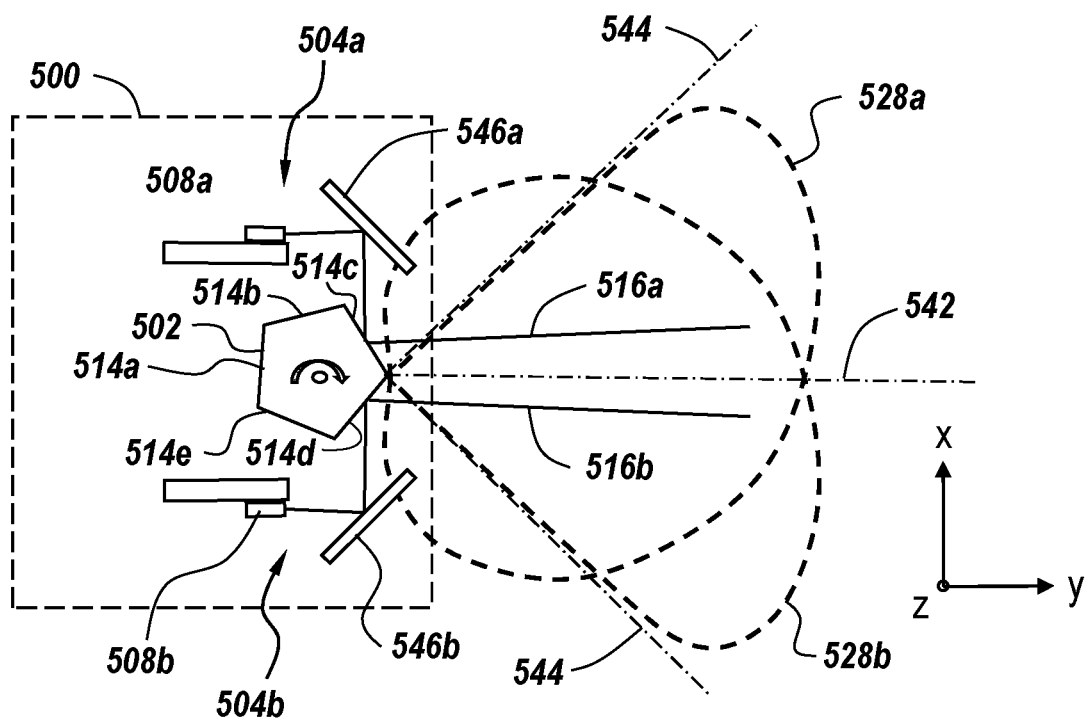
FIG. 5a is an overhead view of a detection system for a vehicle in accordance with the subject technology including graph lines showing field of view.
Figure 5B:
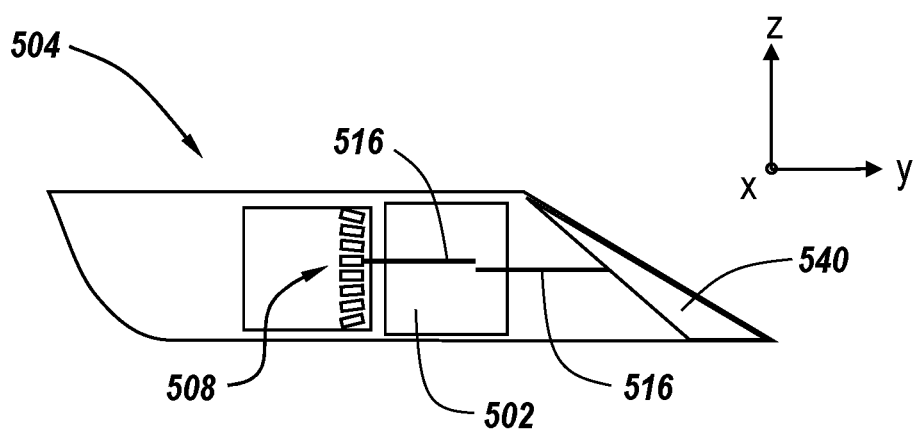

Referring now to FIGS. 5*a*-5*b*, another embodiment of a detection system 500 in accordance with the subject technology is shown. The system 500 is configured similarly to the system 100, except as otherwise described herein. The system 500 includes a rotating reflective member 502 with five reflective sides 514 of different slopes. As with the other systems shown herein, the differently sloped sides 514 cause the field of view of each LiDAR system 504*a*, 504*b* to change as the reflective member 502 rotates as a result of the light transmitter array 508 interacting with different active sides 514 of the reflective member 502. Each LiDAR system 504 also includes a corresponding reflective mirror 546 which is arranged to deflect transmitted light beams 516 from each LiDAR system 504 towards the reflective member 502. It can be advantageous to have the light beams 516 from the two LiDAR systems 504 striking sides 514 of the reflective member 502 from a position that is substantially 180 degrees opposite. Normally, this would require each entire LiDAR system 504 to be positioned on opposite sides of the reflective member 502. This can be particularly difficult since the LiDAR systems 504 normally interact with the front most sides of the reflective member 502 (i.e. the sides closest to the windshield 540) to obtain a field of view of the environment. Space immediately against or next to the upper most portion of the windshield 540 is limited, and it may not be practical or desired to place full LiDAR systems 504 in such a space. Therefore, in the system 500 shown in FIGS. 5*a*-*b* the mirrors 546 allow the light to be deflected at the desired area of the reflective member 502, while the other components of the LiDAR systems 504 (e.g. the transmitters 508) are set further back in the vehicle (along the y axis) or lower in the vehicle (along the z axis).

Referring to FIG. 5*a*, the field of view of the first LiDAR system 504*a* is given by the graph line 528*a* while the field of view of the second LiDAR system 504*b* is given by the graph line 528*b*. The fields of view 528*a*, 528*b* overlap to provide the system 500 with robust resolution around the center of the vehicle, the center being shown by graph line 542. Overall, the approximate effective field of view of the system 500 is captured between the graph lines 544.

Referring to FIG. 5*b*, a side view of either LiDAR system 504 is shown (the LiDAR systems 504*a*, 504*b* are symmetrical so the side view is representative of either system 504*a*, 504*b*). The system 504 includes an array of LiDAR transmitters 508 arranged in a vertical column extending along the z-axis. Each LiDAR transmitter in the array 508 transmits a light beam 516 which deflects off the active reflective side of the reflective member 502 and passes out the windshield 540. Notably, in FIG. 5*b*, only one transmitted light beam 516 is shown for simplicity, it being understood that each transmitter in the array 508 would be transmitting a light beam 516. This arrangement of components can also be incorporated, in different embodiments, in the other systems described herein unless otherwise stated.

Figure 6:
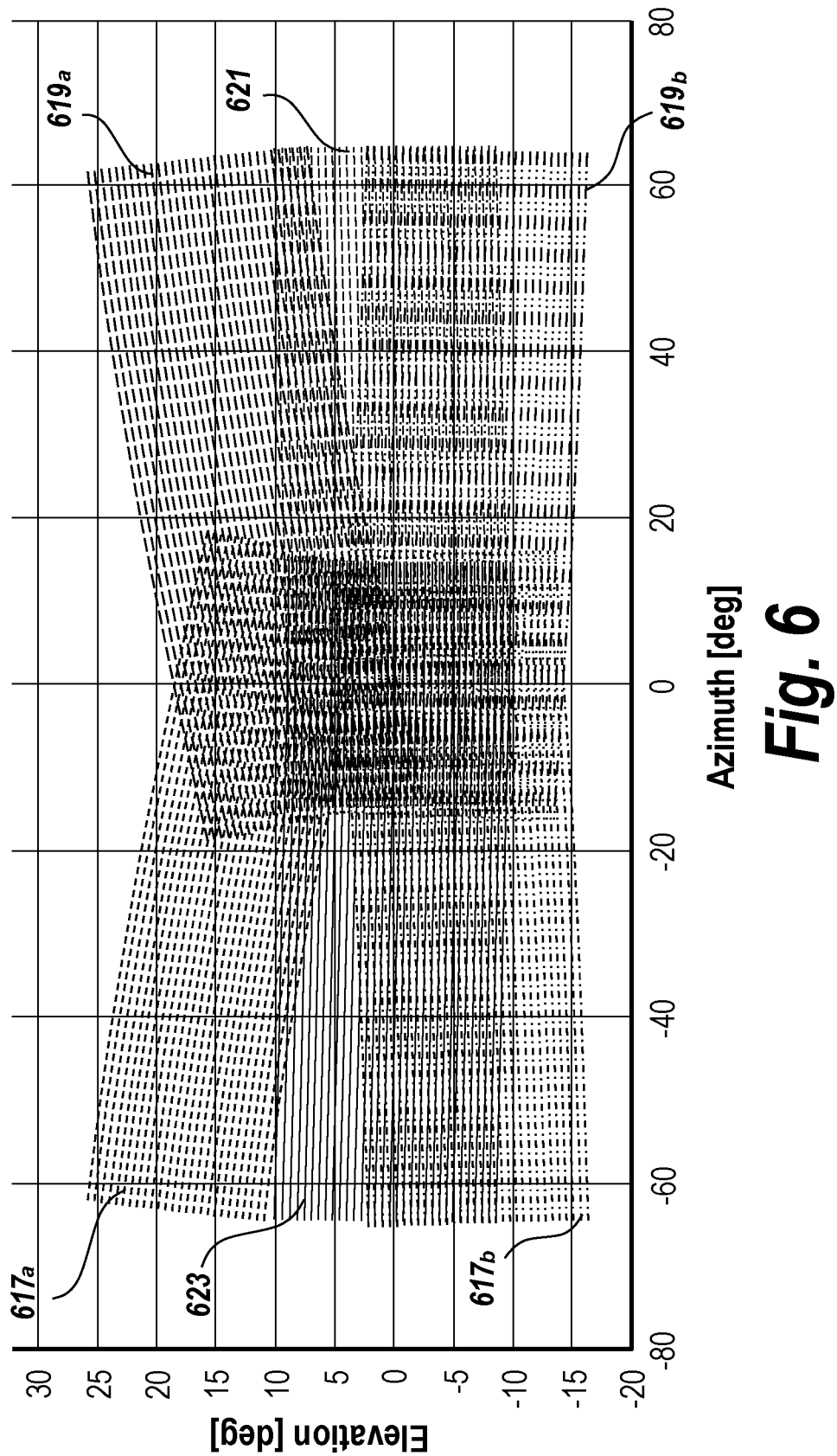
FIG. 6 is a graph of an exemplary scan pattern of a detection system in accordance with the subject technology.
Figure 7A:
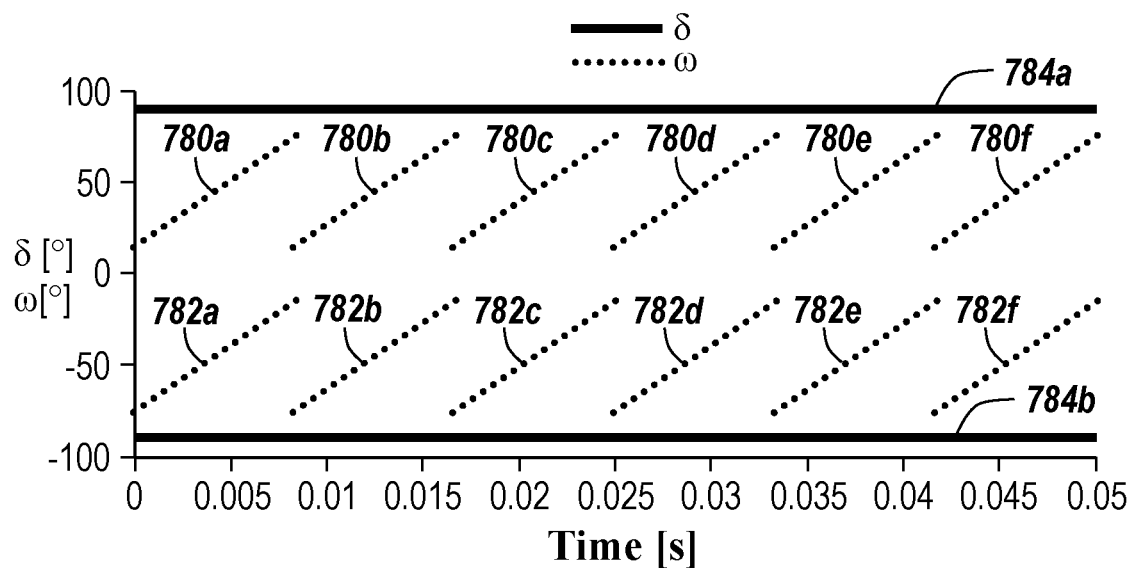
FIG. 7a is an exemplary graph showing angles of the reflective member and light transmitters between two different corresponding detection systems and the environment, over time.
Figure 7B:
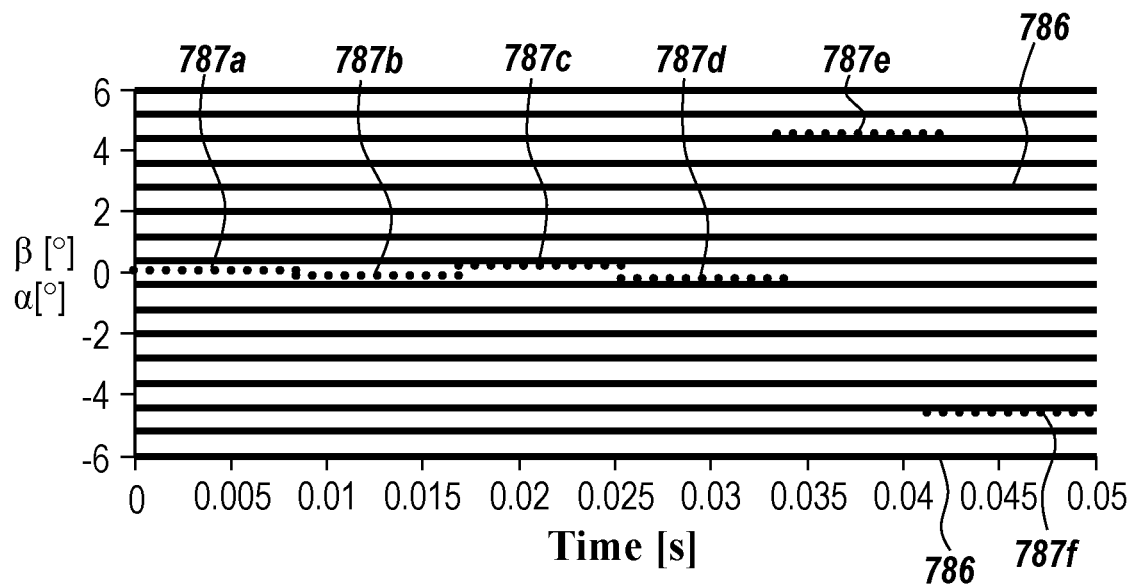
FIG. 7b is an exemplary graph showing angles of the reflective member and light transmitters between two different corresponding detection systems and the environment, over time.

Referring now to FIGS. 6-7*b* graphs of an exemplary detection system in accordance with the subject technology are shown. In particular, FIG. 6 shows the scan pattern formed by a detection system with two LiDAR systems, each LiDAR system having 6 light transmitters and interacting with different active sides of a reflective member. As the reflective member rotates, the 6 light transmitters scan in the azimuth direction based on the rotation of the polygon and in the elevation direction based on the slope of the reflective member. The transmitted light beams of the detection system are each represented by a single line on the graph during a particular scan. The x-axis represents the scan, in azimuth, of each light transmitter as it interacts with a particular side of the reflective member. Similarly, the y-axis represents the scan in elevation of each light transmitter. While interacting with a given active side of the reflective member, the 6 light transmitters of a given LiDAR system run parallel to one another across the azimuth and elevation scan pattern graph of FIG. 6. Each side of the reflective member has a slope angle different than the slope angles of the others of the reflective sides. Further, the LiDAR systems are confirmed to overlap at a central area directly in front of the vehicle to provide more detailed information at the area of greatest concern.

The reflective sides of the reflective member have a small incremental difference in slope so that as the reflective member rotates the scan pattern shown in FIG. 6 is filled in. As such, the reflective sides of the reflective member with the greatest slope with respect to the origin cause a first LiDAR system to scan the upper most portions of the scanned elevation area (graph lines 617*a*) as well as the lower most portions of the scanned elevation area (graph lines 617*b*). Graph lines 623 represent the scanned area when the first LiDAR system interacts with an active reflective side which is not sloped with respect to the origin. A second LiDAR system, positioned on the other side of the reflective member, scans on the other side of the vehicle, overlapping with the first LiDAR system between −20 and 20 degrees in the azimuth scan direction directly in front of the vehicle. Similar to as described with respect to the first LiDAR system, the reflective sides of the reflective member with the greatest slope with respect to an origin cause the second LiDAR system to scan the upper most portions of the scanned elevation area (graph lines 619a) and the lower most portions of the scanned elevation area (graph lines 619b). Graph lines 621 represent the scanned area when the second LiDAR system interacts with the active reflective side that is not sloped with respect to the origin. In general, this arrangement generates a coarse scan over a large vertical and horizontal field-of-view, with more detailed information near the center. This creates an overall system that optimizes resolution in the area of most importance, while also optimizing range of the system as a whole.

The relative angles of the reflective sides and light transmitters that generates the scan pattern of FIG. 6 are shown in the graphs of FIG. 7a-7b. The graphs of FIG. 7a-7b represent one full scan cycle, which is one full rotation of the reflective member. In FIG. 7a-7b, the variables shown are defined as follows:

$\delta$=represents the scan angle of the light transmitters of each of the LiDAR systems, as represented by reference numeral 784a (representing the first LiDAR system) and reference numeral 784b (representing the second LiDAR system). As can be seen, the angle of the light transmitters themselves do not change over a given scan pattern.

$\omega$=represents the horizontal rotation angle of reflective member relative to each LiDAR system. The lines labeled 780a-780f show the slopes of the reflective sides with respect to the first LiDAR system over the course of the scan while the lines labeled 782a-782f show the slopes of the reflective sides with respect to the second LiDAR system over the course of the scan. Each separate line 780, 782 shows the change in azimuth scan angle caused by the rotational of the reflective member over the course of the LiDAR array's interaction with that active side. The entire scan pattern includes the six separate azimuth scans of each system represented by the interaction with the six separate reflective sides for each system.

$\beta$=represents the incoming angle of the lasers for each transmitter from the transmitter arrays. Each line 786 represents one light transmitter and corresponding transmitted light beam. As can be seen, the incoming angle of each light transmitter is different from that of the other light transmitters, but is unchanging over a given scan.

$\alpha$=represents the slope angle of the active reflective side of the reflective member with respect to an origin. Each line 787a-787f represents the slope of a separate reflective side. As the reflective member turns, a different reflective side with a different slope angle becomes active with respect to each LiDAR system (note that with two separate LiDAR systems there would actually be two different active reflective sides at any given time). In the example shown, the first four reflective sides, represented by lines 787a-787d have only small differences in slope, while the other two reflective sides 787e-787f have large differences in slope. This produces a scan pattern as can be seen in FIG. 6 with good resolution around boresight (i.e. at 0 degrees azimuth and elevation) as well as wide overall range.

Figure 8:
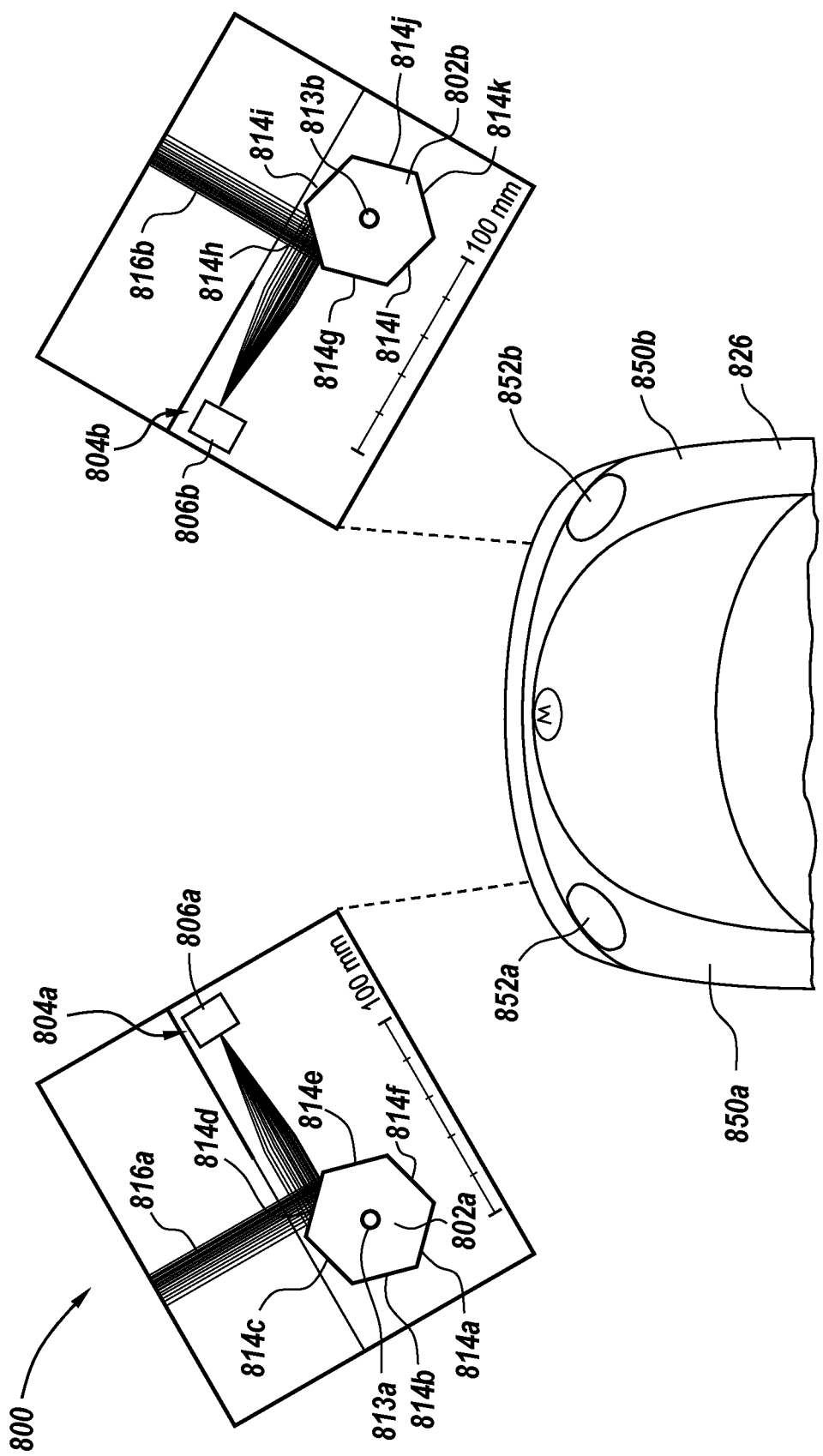
FIG. 8 is an overhead view of a vehicle having a detection system with two separate LiDAR systems for a vehicle in accordance with the subject technology.

Referring now to FIG. 8, an overhead view of a detection system 800 on a vehicle 826 is shown. The detection system 800 is similar to the other systems discussed herein, such as the detection system 100, except as otherwise mentioned. In particular, the system 800 differs from other systems discussed herein in that it includes two separate reflective members 802a, 802b, each placed at a different location on the vehicle 826 which interactive with separate LiDAR systems 804a, 804b. Similarly to the other reflective members, the reflective members 802 each include a plurality of reflective sides 814 which differ in slope from at least one of the other reflective sides 814. Since the reflective members 802 are separated, each reflective member 802 rotates around a separate rotational axis 813a, 813b.

Separate LiDAR systems 804a, 804b interact with each reflective member 802. Notably, many of the components of the individual LiDAR systems 804, are omitted in FIG. 8 for simplicity. Instead, only an array of LiDAR transmitters 806a, 806b for each system 804a, 804b is shown directing light beams 816 towards the respective reflective member 802a, 802b. The reflective member 802 then deflects the light beams 816 off an active reflective side 814 (shown as side 814d for reflective member 802a and side 814h for reflective member 802b). After striking an object in the environment, the returning light beams are received by one or more light receivers within each LiDAR system 804.

In the embodiment shown in FIG. 8, the LiDAR systems 804 are placed at different locations on the vehicle 826 to improve the field of view of the detection system 800 as a whole. As such, the first LiDAR system 804a is on a first half 850a of the vehicle 826 proximate to a headlight 852a. In the example given, the first half 850a of the vehicle 826 is the left half and the proximate headlight 852a is the left headlight. Conversely, the second LiDAR system 804b is positioned on the second half 850b of the vehicle 826 and positioned proximate to a second headlight 852b. The second half 850b of the vehicle 826 can be the right side of the vehicle 826 and the second headlight 852b can be the right side headlight.

Figure 9:
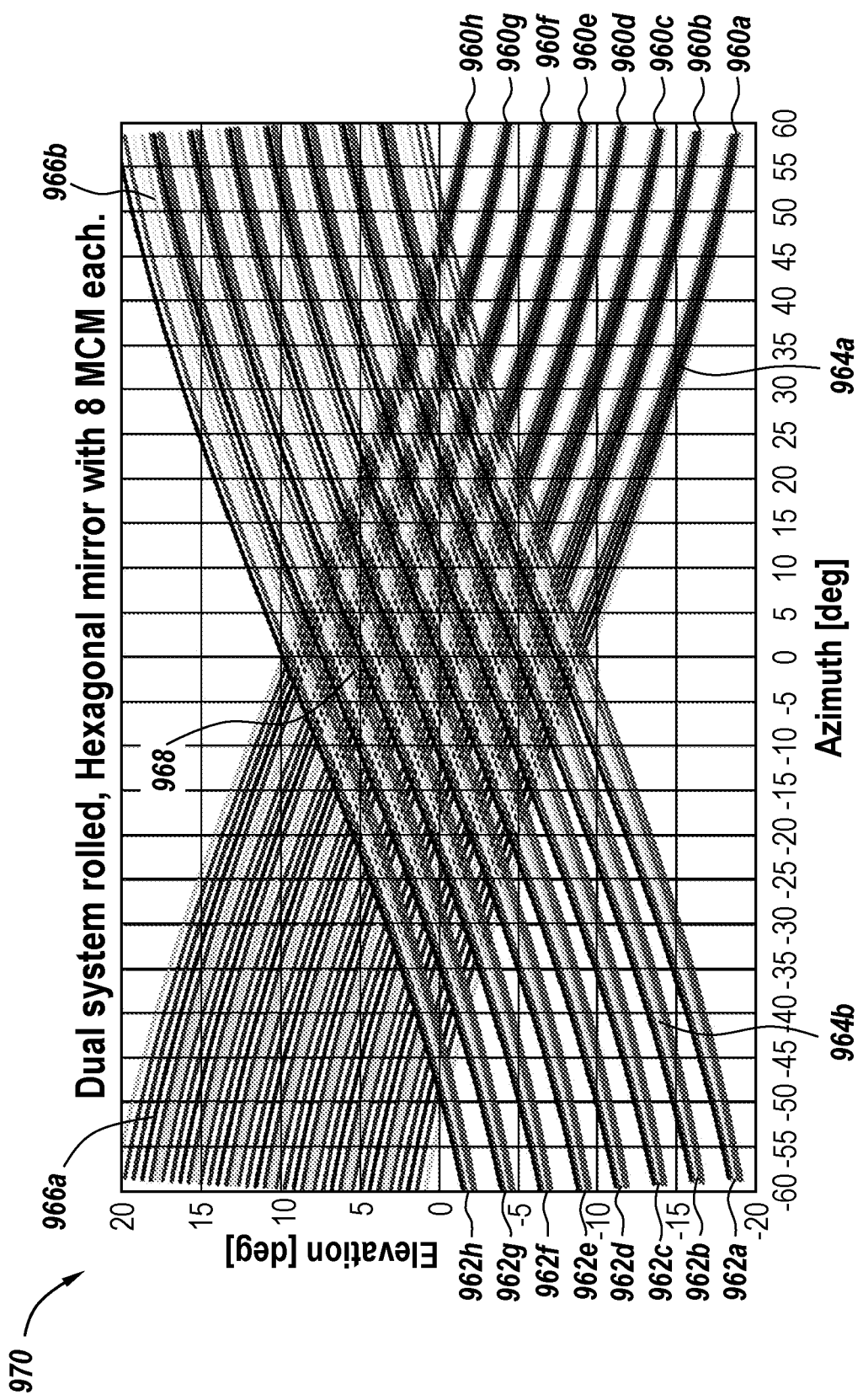
FIG. 9 is a graph of an exemplary scan pattern produced by the detection system of FIG. 8.
Figure 10:
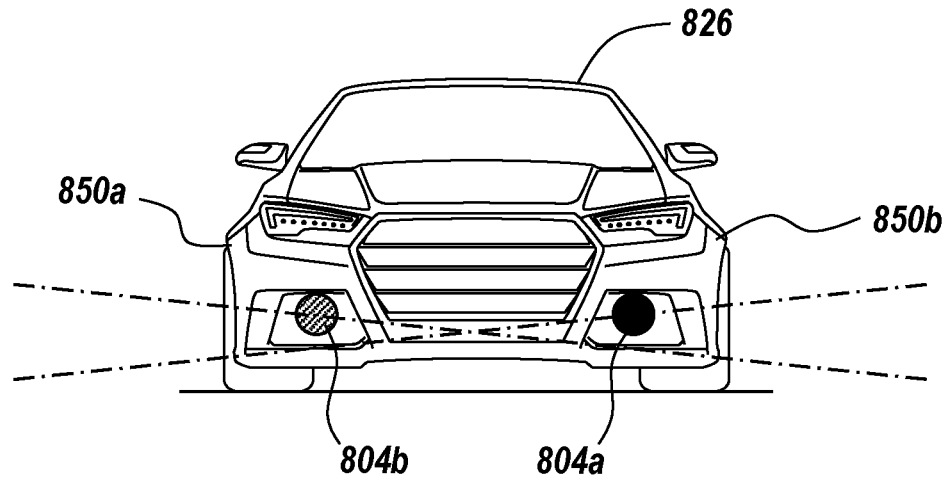
FIG. 10 is a front view of the vehicle of FIG. 8 showing a simplified version of the exemplary scan pattern of FIG. 9.

Referring now to FIGS. 9-10, exemplary scan patterns of the detection system 800 are shown. The y-axis of the graph 970 shows the area of the environment scanned in elevation while the x-axis of the graph 970 shows area of the environment scanned in the azimuth. Each cluster of graph lines 960a-960h represents the scan pattern generated by one light beam 816a from one light transmitter from the array of light transmitters 806a of the first LiDAR system 804a. Each LiDAR system 804 of the system 800 includes an array of 8 individual light transmitters. Therefore the 8 clusters 960a-960h represent the path illuminated by each light transmitter in the array 806a during a scan (i.e. a full rotation of the reflective member 802a). Within each cluster 960, the individual graph lines are generated as a result of the differently sloped sides 814 of the reflective member 802a. That is, once an individual light transmitter from the array 806a hits a different side of the reflective member 802a, the light transmitter is caused to illuminate a slightly different area of the environment, therefore providing the LiDAR system 804a with a slightly different field of view of the environment. As can be seen, the full scan pattern forms eight clusters 960, which leave only small gaps in what is scanned. Therefore substantially all of the environment within the outer scanning parameters becomes visible to the detection system 800. The second LiDAR system 804b scans similarly to the LiDAR system 804a, with each light transmitter 806b similarly being represented by a graph line cluster 962 (the cluster being a function of the scan area of each light transmitter in the array 806b changing as the reflective member 802b rotates).

Ideally, the LiDAR systems 804 can be configured to generate a scan pattern in accordance with the pattern shown in FIG. 9. In particular, the scan patterns 960, 962 of the first and second LiDAR systems 804a, 804b overlap in an area 968 central to the vehicle 826. A first upper zone 966a is scanned exclusively by the first LiDAR system 804a while a second upper zone 966b is scanned exclusively by the second LiDAR system 804b. Similarly a first lower zone 964b is scanned exclusively by the second LiDAR system 804b while a second lower zone 964a is scanned exclusively by the first LiDAR system 804a. In this way, the detection system 800 has a maximum resolution around the central area 968, directly in front of, and at an elevation around, the center of the vehicle 826. Yet the detection system 800 still has field of view of the upper and lower zones 966, 964. FIG. 10 depicts generally how this scan pattern is formed from the detection system 800 the vehicle 826 of FIG. 8.

It is notable that while graph 970 shows the scan patterns of the first and second LiDAR systems 804a, 804b overlap as they scan the central area 968, the systems 804a, 804b can also be offset to overlap in different ways. For example, the scan pattern of each system 804a, 804b, could instead overlap in a portion of one of the lower zones 964a, 964b, or in a portion of one of the upper zones 966a, 966b. Additionally, the LiDAR systems 804a, 804b could be decoupled so that there is only a small overlap in azimuth scanning, while the widest areas of the field of view of the detection system 800 are scanned in azimuth only by one of the LiDAR systems 804a, 804b.

Figure 11A:
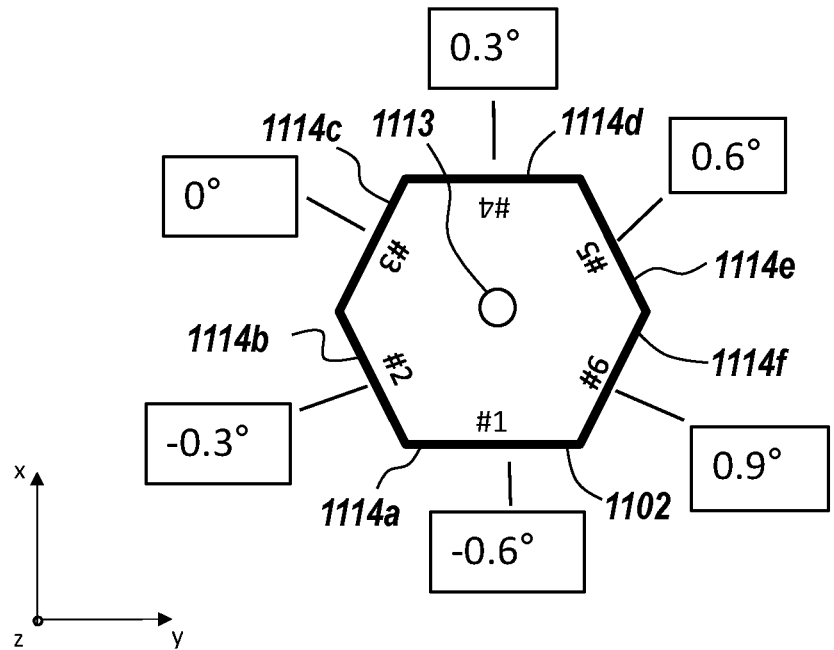
FIG. 11a is an overhead view of an exemplary reflective member in accordance with the subject technology.

Referring now to FIG. 11a, an exemplary overhead view of a reflective member 1102 is shown. The reflective member 1102 can be incorporated within the other detection systems as discussed herein. Each reflective side 1114 has a slope that differs incrementally from the slope of the others of the reflective sides 1114. In the example given, adjacent 1114 sides generally have a slope that differs by 0.3 degrees from most adjacent sides. The reflective member 1102 is six sided, with each side 1114 having a different slope than all others of the sides. Notably, different numbers of sides 1114 can be included in different embodiments. Further, the sides 1114 need not have different slopes from every other side 1114 (although they do in some cases) but they do have a slope that is different than at least one of the other sides 1114. Further, the slopes of each side 1114 shown and discussed herein represent only the difference in slope of each side as towards the rotational axis 1113 of the reflective member 1102 with respect to an origin. The origin, however, can itself be at an angle with respect to the rotational axis 1113. For example, in some cases the origin can be a slope of 30 or 45 degrees towards the rotational axis 1113, particularly when the related LiDAR transmitters are positioned at an elevation below the reflective member 1102. Therefore it should be understood that the slopes given for each side 1114 represent only the relative slopes with respect to the other sides 1114.

In general, the reflective sides 1114 differ in slope by substantially 0.3 degrees (i.e. +1-10%) between adjacent sides, or alternatively between 0.2 and 0.4 degrees. The origin point of the slope of the reflective sides is represented by the angle denoted "0" (side 1114c, side #3). The angles of the other sides 1114 with respect to the origin side 1114c are as follows: 1114a has an angle of −0.6 degrees; 1114b has an angle of −0.3; 1114d has an angle of 0.3 degrees; 1114e has an angle of 0.6 degrees; and 1114f has an angle of 0.9 degrees. Therefore there is in incremental slope of 0.3 degrees between all adjacent sides (with the exception of the angle between the side 1114f and side 1114a, which differ by 1.5 degrees). This results in a slightly different field of view canvassed by a corresponding LiDAR system when the system interacts with each reflective side 1114.

Figure 11B:
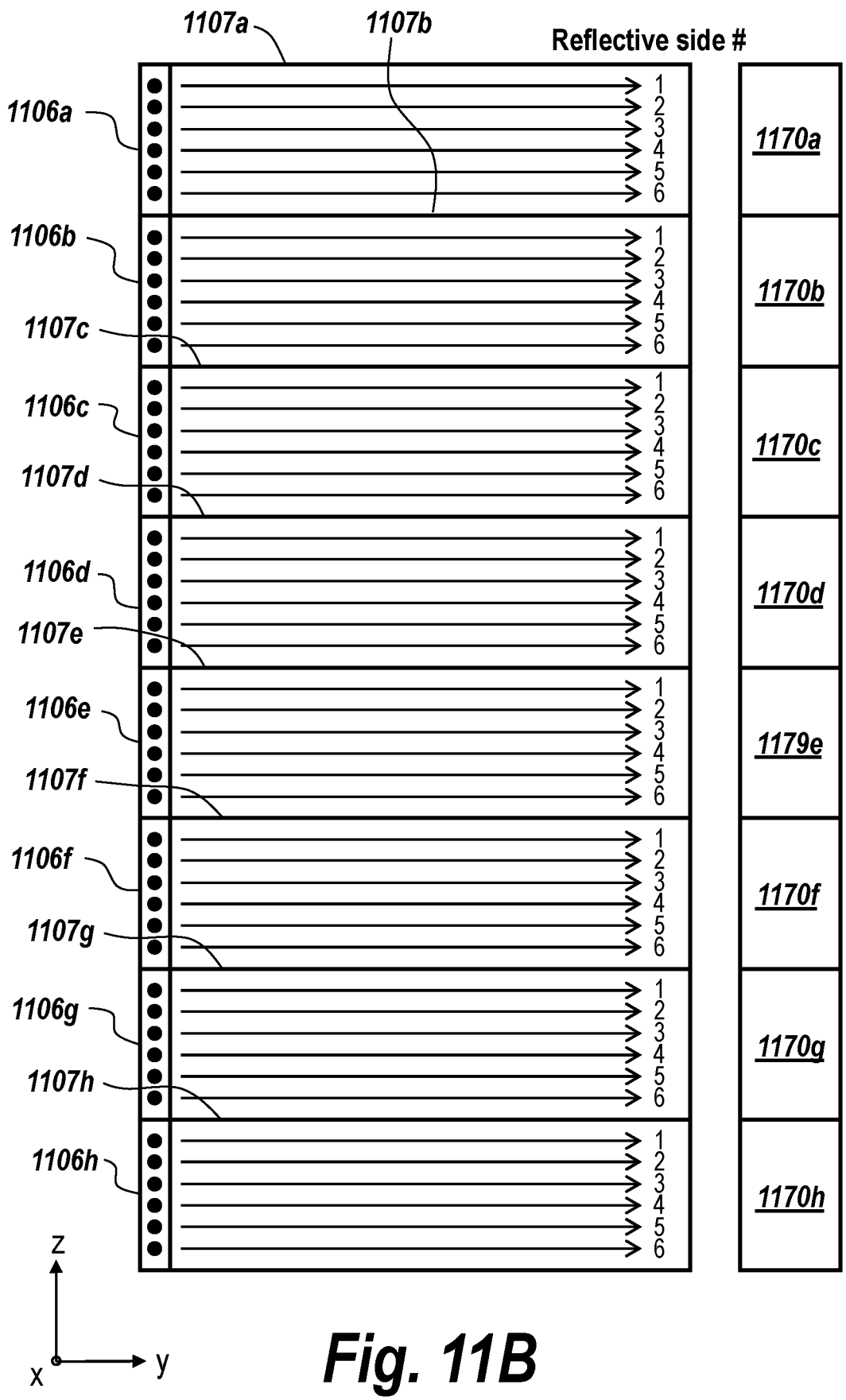

Referring now to FIG. 11b, the scan pattern of the reflective member 1102 is shown. In particular, the detection system represented in FIG. 11b includes eight separate light transmitters in an array 1106 in a LiDAR system, the array 1106 arranged in a vertical column. The boxes 1107a-1107h each represent the light path as the corresponding individual light transmitter 1106a-1106h from an array. Each light beam from a transmitter 1106 strikes a particular side of the reflective member 1102, labeled #1-#6. That is, the individual lines shown within each box 1107 show the area covered by an individual light transmitter from the array 1106 of the LiDAR system as it reflects off each of the six reflective sides 1114. The reflective member 1102 being six sided, each light transmitter takes six different paths as displayed within each box 1107a-1107h, depending on which side 1114 the transmitter 1106 is striking. The boxes 1170a-1170h represent different areas of the environment covered by the LiDAR system as the emitted light beams deflect off a corresponding active side of the reflective member 1102. The system as arranged results in the path of each light transmitter 1106 shifting only slightly when it reflects off a different side 1114 of the reflective member 1102. As a result, the paths of each light transmitter 1106 never cross a path of any other light transmitter 1106. For example, the paths of the first light transmitter 1106a are all contained within the first box 1107a to scan a first area of the environment 1170a, and do not overlap with the paths in the second box 1107b or the second area of the environment 1170b. In this way, the exemplary system of FIGS. 11a-11b is arranged such that each light transmitter 1106a-1106h canvasses a given area 1170a-1170h of the environment as the reflective member 1102 rotates.

Figure 12A:
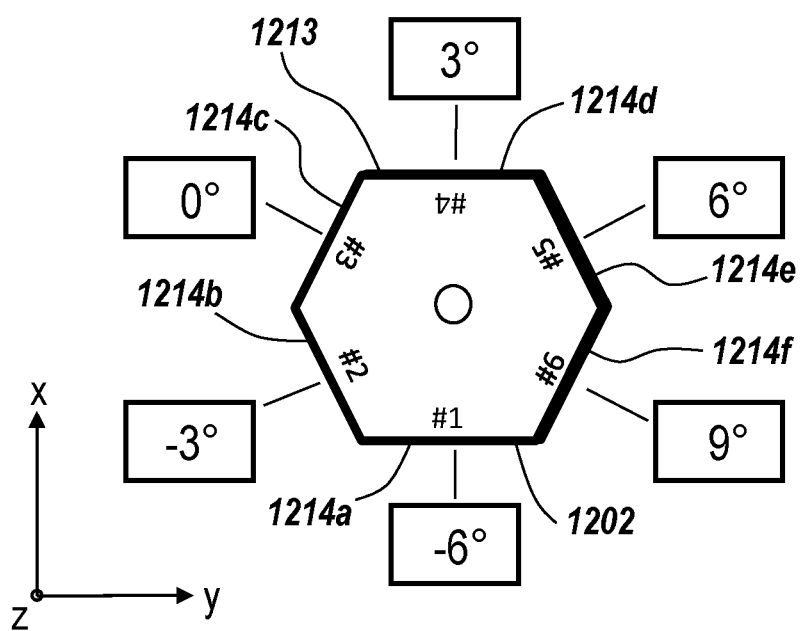
FIG. 12a is an overhead view of an exemplary reflective member in accordance with the subject technology.

Referring now to FIG. 12a another exemplary overhead view of a reflective member 1202 is shown. The system shown in FIG. 12a is similar to that shown in FIG. 11a, the major difference being that the sides 1214 of the reflective member 1202 are sloped differently than the sides of the reflective member 1102. Specifically, rather than differing by 0.3 degrees from most adjacent sides, the sides 1214 differ in slope from most other adjacent sides by substantially 3 degrees (i.e. +1-10%), or alternatively by 2 to 4 degrees. Like the reflective member 1102, the sides 1214 of the reflective member 1204 are shown with slopes differing from an origin side (defined arbitrarily by side 1214c). With respect to the origin side 1214c, the slope angles of the other sides 1241 differ by as follows: 1214a has an angle of −6 degrees; 1214b has an angle of −3; 1214d has an angle of 3 degrees; 1214e has an angle of 6 degrees; and 1214f has an angle of 9 degrees. Therefore there is in incremental slope of 3 degrees between all adjacent sides (with the exception of the angle between the side 1214f and side 1214a, which differ by 15 degrees). This results in a shift in the field of view canvassed by the LiDAR system when a different side of the reflective member 1202 is the active side (i.e. the side interacting with the LiDAR transmitters 1206).

Figure 12B:
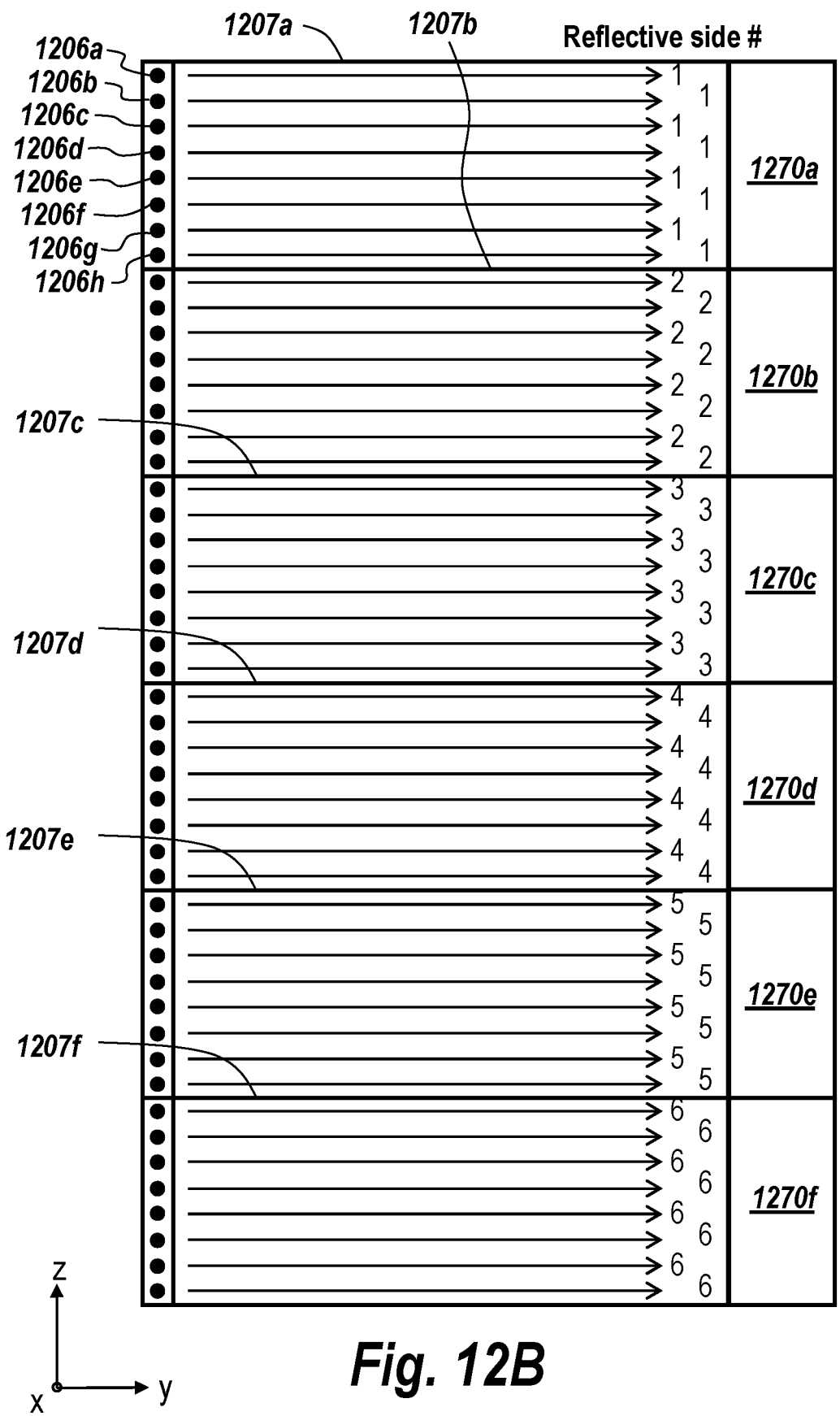

Referring now to FIG. 12b, the scan pattern of the reflective member 1202 is shown. Since the reflective sides 1214 of the reflective member 1202 differ more significantly than the reflective sides 1114 of the reflective member 1102, FIG. 12 shows that the resulting scan pattern of the light transmitters 1206 is much more spread out. In general, the LiDAR system itself represented in FIG. 12b is similar to the LiDAR system that generates the scan pattern of FIG. 11b, the differences in the scan pattern of FIGS. 11b and 12b being a function of the differently sloped sides 1114, 1214 of the respective reflective members 1102, 1202 rather than differences in other features of the LiDAR systems used.

Still referring to FIG. 12b, the scan pattern shown is generated by 8 individual light transmitters 1206a-h in an array. Each box 1207a-f depicts the scan pattern of the light transmitters 1206 when they are interacting with one active side of the reflective member 1202. For example, the first box 1207*a* shows the scan pattern of the LiDAR system when a first reflective side 1214*a* is interacting with the light transmitters 1206. Further, when interacting with the first reflective side 1214*a*, the light transmitters 1206 scan, and provide a field of view of, a first area of the environment 1270*a*. As the reflective member 1202 rotates, a second reflective side 1214*b* becomes the active reflective side, the light transmitters 1206 then form the scan pattern shown in the second box 1207*b*, shifted in elevation, to scan a second area of the environment 1270*b*. Since the reflective sides 1214 of the reflective member 1202 have a significant difference in slope of 3 degrees between most adjacent sides, the resulting scanning zone 1270*a*-1270*f* produced by the light transmitters 1206 do not overlap with the others of the scanning zones 1270 produced by the light transmitters 1206. For example, the zone 1270*a* scanned when the LiDAR system is interacting with first reflective side 1214*a*, is completely different than the zone 1270*b* scanned by the LiDAR system when interacting with the second reflective side 1214*b*, and so on. Therefore the slope of each reflective side 1214 causes a different zone 1270 of the environment to be scanned such that a large field of view is scanned by the detection system.

Notably, the examples given in FIGS. 11*a*-12*b* are provided to show typical scan patterns of an exemplary LiDAR system of a detection system. Necessary components of the detection systems, as shown and discussed herein and known to those of skill in the art, have been omitted for simplicity.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. actuators, transmitters, receivers, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. It should be understood that various features of the technology disclosed herein can be combined with other disclosed features and/or separate embodiments, even if not explicitly disclosed.

What is claimed is:

1. A detection system for a vehicle in an environment, comprising:
   a reflective member having a rotational axis and a plurality of reflective sides, each of the reflective sides sloping towards the rotational axis at a slope angle different than the slope angle of at least one of the others of the reflective sides;
   a first LiDAR system including at least one first light transmitter and at least one first light receiver, the first LiDAR system configured to interact with a first active side of the plurality of reflective sides;
   a second LiDAR system including at least one second light transmitter and at least one second light receiver, the second LiDAR system configured to interact with a second active side of the plurality of reflective sides; and
   an actuator configured to rotate the reflective member to change: the first active reflective side to a first different one of the plurality of reflective sides; and the second active reflective side to a second different one of the plurality of reflective sides, wherein:
   the first LiDAR system is configured to interact with the first active side to scan, in azimuth, a first zone and a second zone, the first zone being at least partially to a first side of the vehicle and the second zone being at least partially in front of the vehicle;
   the second LiDAR system is configured to interact with the second active side to scan, in azimuth, the second zone and a third zone, the third zone being at least partially to a second side of the vehicle;
   the vehicle includes a windshield having an upper portion, a central portion, and a lower portion, the reflective member, the first LiDAR system, and the second LiDAR system being positioned proximate to the upper portion;
   the detection system further comprises: an upper reflective mirror coupled, and parallel, to the upper portion of the windshield; and a lower reflective mirror coupled to, and offset from, the windshield and positioned parallel to the upper reflective mirror;
   the upper reflective mirror directs a field of view of the first and second LiDAR systems between the reflective member and the lower reflective mirror; and
   the lower reflective mirror directs the field of view of the first and second LiDAR systems between the upper reflective mirror and the environment.

2. The detection system of claim 1 further comprising:
   a second upper reflective mirror coupled to the upper portion of the windshield; and
   a second lower reflective mirror offset from the windshield,
wherein:
   the second upper reflective mirror directs a field of view of the second LiDAR system between the reflective member and the second lower reflective mirror; and
   the second lower reflective mirror directs the field of view of the second LiDAR system between the second upper reflective mirror and the environment.

3. The detection system of claim 1 wherein the light transmitters of the first LiDAR system and the second LiDAR system transmit p-polarized light beams, the lower reflective mirror directing the light beams from the first and second LiDAR systems to pass through the windshield.

4. The detection system of claim 1 wherein light beams from the first LiDAR system and the second LiDAR system are directed through the windshield within 10 degrees of a Brewster angle for the windshield.

5. The detection system of claim 1 further comprising: a prism positioned on the inside of the upper portion of the windshield, the prism configured to direct p-polarized transmitted light beams from at least one of the first and second LiDAR systems through the windshield and into the environment.

6. The detection system of claim 5 wherein the prism is further configured such that the transmitted light beams are directed through the windshield within 10 degrees of a Brewster angle for the windshield.

7. The detection system of claim 1 wherein the slope of each reflective side differs incrementally by between 2 and 8 degrees.

8. The detection system of claim 1 wherein the slope of each reflective side differs incrementally by between 0.2 and 0.4 degrees.

9. The detection system of claim 1 wherein the slope of each reflective side differs from the slope of one directly adjacent reflective sides by substantially the same degree.

10. The detection system of claim 1 wherein the reflective member includes 5 or 6 reflective sides.

11. The detection system of claim 1 wherein the at least one first light transmitter includes an array of light transmitters configured to transmit light beams to the first active side in a column parallel to the rotational axis.

12. The detection system of claim 1 wherein the slope angle of each of the reflective sides is different than the slope angle of each of the others of the reflective sides.

* * * * *